United States Patent [19]

Nakayama et al.

[11] Patent Number: 5,712,968
[45] Date of Patent: Jan. 27, 1998

[54] SYSTEM FOR ESTABLISHING NEW PATH IN RING NETWORK AND DIVIDING RING SHAPED PATH INTO PLURALITY OF RING SHAPED PATHS BY BEING RID OF FAULTY PATH

[75] Inventors: Yoshiyuki Nakayama, Pala Alto, Calif.; Takeshi Ishizaki, Kawasaki, Japan; Kenjiro Mori, Machida, Japan; Fumio Nakamura, Kawasaki, Japan; Tadashi Yamamitsu, Handano, Japan

[73] Assignee: Hitachi, Ltd., Tokyo, Japan

[21] Appl. No.: 910,454

[22] Filed: Jul. 8, 1992

[30] Foreign Application Priority Data

Jul. 8, 1991 [JP] Japan ............................ 3-167141

[51] Int. Cl.$^6$ ............................................. G06F 11/00
[52] U.S. Cl. ................ 395/182.02; 395/200.21; 371/20.6; 370/216
[58] Field of Search ............................. 395/200, 575, 395/200.11, 200.21, 182.02, 200.04; 370/14, 16, 16.1, 85.5, 216, 221–228; 371/8.2, 11.1, 11.2, 20.6

[56] References Cited

U.S. PATENT DOCUMENTS

| | | | |
|---|---|---|---|
| 4,415,973 | 11/1983 | Evans | 395/800 |
| 4,468,734 | 8/1984 | Lanier et al. | 395/182.02 |
| 4,835,763 | 5/1989 | Lau | 370/223 |
| 5,136,589 | 8/1992 | Konishi | 371/20.6 |
| 5,146,587 | 9/1992 | Francisco | 395/185.1 |
| 5,179,548 | 1/1993 | Sandesara | 370/222 |
| 5,185,860 | 2/1993 | Wu | 395/200.11 |
| 5,185,866 | 2/1993 | Francisco | 395/280 |
| 5,226,037 | 7/1993 | Satomi et al. | 370/220 |
| 5,247,381 | 9/1993 | Olmstead et al. | 359/118 |
| 5,307,353 | 4/1994 | Yamashita et al. | 371/20.6 |
| 5,327,427 | 7/1994 | Sandesara | 370/222 |
| 5,351,040 | 9/1994 | Matsuura et al. | 371/5.5 |

OTHER PUBLICATIONS

"A hierarchical restructurable multi–procesor architecture", by Arnold et al, IEEE, Jan. 1976.

*Primary Examiner*—Moustafa M. Meky
*Attorney, Agent, or Firm*—Antonelli, Terry, Stout & Kraus, LLP.

[57] ABSTRACT

A conference system is formed by multiple workstations which have individual conference control programs and are connected to a network, with each workstation having a destination workstation determined in advance so that a ring-shaped logical communication path is formed on the network. A conference control program which detects a fault on its receiving path during a conference sends a fault recovery request message including an identifier of the conference control program itself and the address of the workstation to the neighboring workstation, and the conference control program of the neighboring workstation relays the received fault recovery request message to the next workstation on the ring-shaped logical communication path so that the fault recovery request message is propagated on the ring-shaped logical communication path. The conference control program of a workstation which is located immediately upstream of the fault and is therefore unable to send the received fault recovery request message to the neighboring workstation carries out a procedure of establishing a new communication path to the conference control program of the workstation which issued the fault recovery request message.

10 Claims, 19 Drawing Sheets

F I G. 6
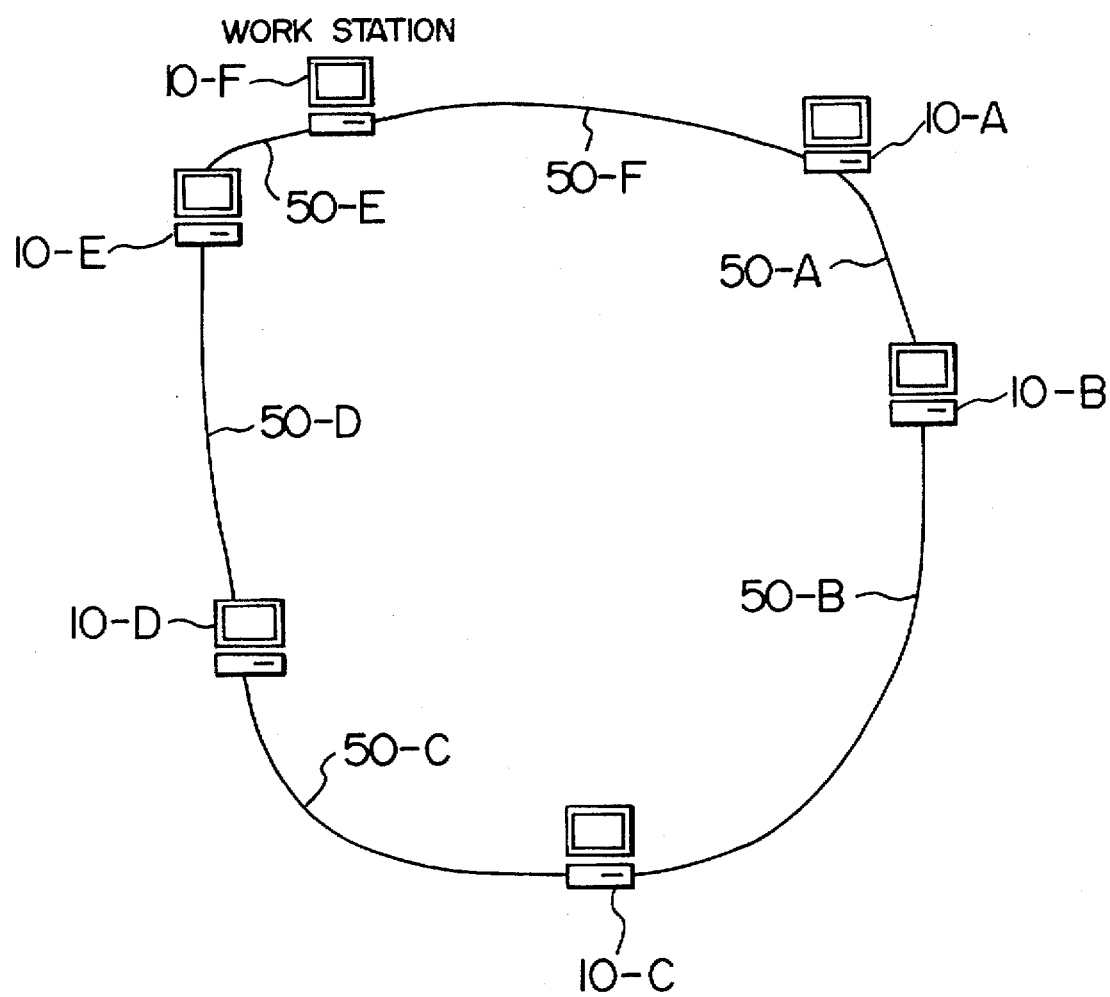

F I G. 21
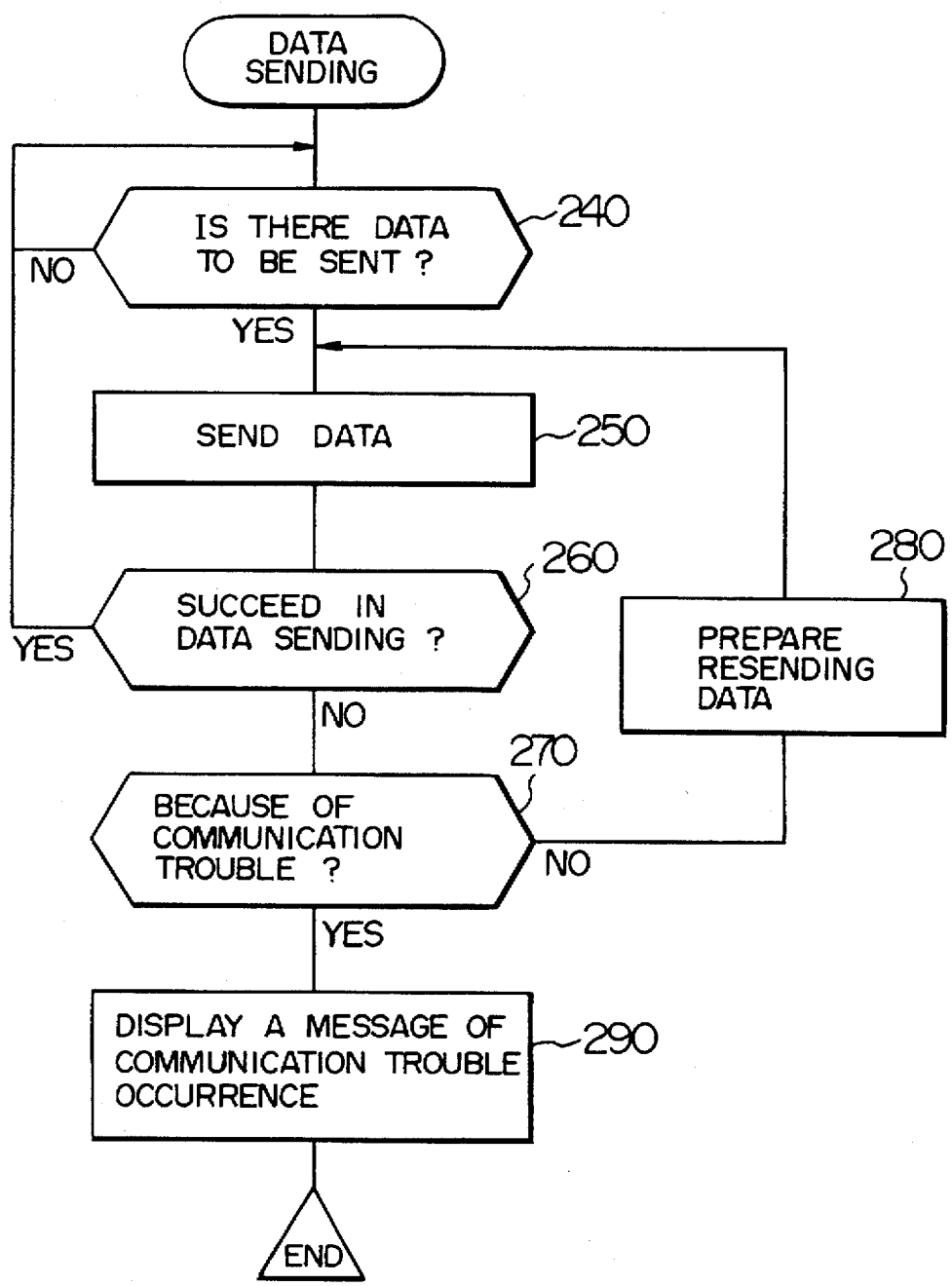

SYSTEM FOR ESTABLISHING NEW PATH IN RING NETWORK AND DIVIDING RING SHAPED PATH INTO PLURALITY OF RING SHAPED PATHS BY BEING RID OF FAULTY PATH

CROSS-REFERENCE TO RELATED APPLICATIONS

This application is related to the following U.S. applications:

U.S. application Ser. No. 07/938,593 filed on Sep. 3, 1992, now U.S. Pat. No. 5,280,583, which is a continuation of U.S. application Ser. No. 07/350,850 filed on May 12, 1989, now abandoned, by Y. Nakayama, K. Mori, K. Takaragi, and S. Domen and originally entitled "Joint Information Processing System Including Plural Terminals";

U.S. application Ser. No. 07/614,087 filed on Nov. 15, 1990, now U.S. Pat. No. 5,208,912, by Y. Nakayama, K. Mori, and T. Yamamitsu and entitled "Joint Information Processing System Comprising a Plurality of Terminal Apparatuses Guaranteeing Identicalness of Data Processing Results"; and U.S. application Ser. No. 07/743,851 filed on Aug. 12, 1991, now U.S. Pat. No. 5,363,507 by Y. Nakayama, K. Mori, and T. Yamamitsu and entitled "Method and System for Storing and Retrieving Collaboratively Processed Information".

The above-identified applications are assigned to the assignee of the present application, and the contents of these applications are incorporated herein by reference.

BACKGROUND OF THE INVENTION

1. Field of the Invention

This invention relates to a conference system or collaborative information processing system including multiple workstations, and more particularly to a method of reorganizing or reconfiguring a communication path which connects the workstations logically in a ring-like connection.

2. Description of the Related Art

There have been proposed conference systems in which a plurality of workstations are connected through a communication network so that a plurality of users in remote places can have a conference or perform group work by viewing the screens of their individual workstations and using common reference materials, as described, for example, in U.S. application Ser. No. 07/350,850, now abandoned.

In the conference system of this kind, users can have a conference by viewing a document, image and picture which are displayed on the screen of all workstations, with displayed information being revised simultaneously for all workstations in response to an operation taken on one workstation, and by talking to each other through individual telephone units.

For a conference held with two or more workstations, it is necessary to transmit an entry operation (data input or command input) in a conference mode window performed by one workstation to all other workstations in a conference mode so that the workstations have the same display content in the window.

In case all workstations have a common program for dealing with entries to conference mode windows, input data generated by an arbitrary workstation are sent to other workstations sequentially and each receiving workstation carries out the same data processing for the data and displays the result on its screen. In another case in which only a specific workstation has the input data processing program, data entered by any other workstation are sent to the specific workstation which processes the data and distributes the result to other workstations.

The above-mentioned joint operation among multiple workstations is controlled by a conference control program installed in all workstations. The conference control program also controls the joining and removal of the workstation to/from a conference.

In organizing a conference system, when a data sending station and a data receiving station are designated in advance for each workstation, it is possible to connect all workstations through a ring-shaped logical communication path irrespective of the actual form of a network. Based on this connection form, data generated by an arbitrary workstation can be propagated sequentially to other workstations.

However, the conventional conference system using a ring-shaped logical communication path has a problem in that if part of the network develops trouble, the conference is entirely closed down.

A fault recovery technique for a communication path based on a general network is disclosed in JP-A-61-25345, for example. This technique is intended for a LAN system in which a plurality of stations located over a relatively local area are connected through duplex communication paths and designed to reorganize or reconfigure a ring-shaped communication path by forming a loop back path in the event of a fault on the communication path. Therefore, this technique cannot be used for the reorganization or reconfiguration of the ring-shaped logical communication path mentioned above.

SUMMARY OF THE INVENTION

An object of this invention is to provide a control method for reorganizing or reconfiguring a ring-shaped logical communication path formed on a network thereby to restore virtually the original performance in the event of a fault on the communication path.

Another object of this invention is to provide a conference system including a plurality of workstations or terminal units connected through a network and having the capability of recovering a conference function in the event of a fault on part of the communication path.

In order to achieve the above objects, a control method for a ring-shaped logical communication path according to one aspect of the invention is as follows. A ring-shaped logical communication path including a plurality of nodes is designed to perform unidirectional message transmission, and a node which has detected a fault on its receiving path generates a fault recovery request message which includes in a sender ID field a node identifier (node ID) assigned to it and sends the message over its sending path, and each node which receives the message sends the received message to the next node on the communication path, and a node which is unable to send the received message to the next node establishes a new sending path to the node indicated by the node identifier included in the sender ID field of the fault recovery request message.

According to another aspect of this invention for a control method for a ring-shaped logical communication path which includes a plurality of nodes, when a fault arises in part of the communication path, a node which has failed to establish a new logical communication path to an adjacent node located on its downstream side on the communication path removes itself from the communication path based on its own control so that the ring-shaped logical communication path is reorganized or reconfigured in a degraded form.

According to still another aspect of this invention for a control method for a ring-shaped logical communication path which includes a plurality of nodes connected in the shape of a ring through a logical communication path, if more than one fault arises simultaneously, multiple nodes close to the defective sections operate to divide the original communication path into multiple independent ring-shaped logical communication paths by removing the defective sections.

According to still another aspect of this invention for a control method for a ring-shaped logical communication path which includes a plurality of nodes connected in the shape of a ring through a logical communication path, a node which is close to a defective section on the upstream side of the defective section operates to remove the defective section from the communication path and form a new communication path to a relay node which functions to relay data to a node located on the downstream side of the defective section.

The conference system based on this invention includes a plurality of workstations connected through a network. Each workstation includes display means having a multi-window display function, input means for entering data and/or a command to an arbitrary window created on the screen of the display means, data processing means for processing input data provided by the input means in accordance with a program which corresponds to the window to which the input data has been entered and delivering the result to the window on the screen, and interface means for sending and receiving data to/from the network.

The data processing means includes conference control means which correlates one of the other workstations to an input logical communication path and another one of the other workstations to an output logical communication path, sends input data and/or a control message which has been entered by the input means or received by the interface means from the network selectively through the interface means to the workstation correlated to the output logical communication path, and executes data processing in accordance with the input data and/or control message with a program.

The conference control means includes means for generating a fault recovery request message including an identifier assigned to the conference control means in response to the detection of abnormality of data reception by the interface means from the network due to a communication failure, means for sending the fault recovery request message to the workstation correlated to the output logical communication path, and means for correlating a workstation which has the conference control means indicated by the identifier included in the fault recovery request message to the output logical communication path in place of the workstation currently correlated to the output logical communication path if the sending means is unable to send the fault recovery request message to the workstation currently correlated to the output logical communication path.

These and other objects, advantages, manner of operation, and novel features of the present invention will be understood from the following detailed description taken in conjunction with the accompanying drawings.

BRIEF DESCRIPTION OF THE DRAWINGS

FIG. 6 is a diagram showing the conference system of FIG. 1 from the viewpoint of the ring-shaped logical communication path;

FIG. 21 is a flowchart showing the data sending process carried out by the conference control program.

DESCRIPTION OF THE PREFERRED EMBODIMENTS

Figure 1:
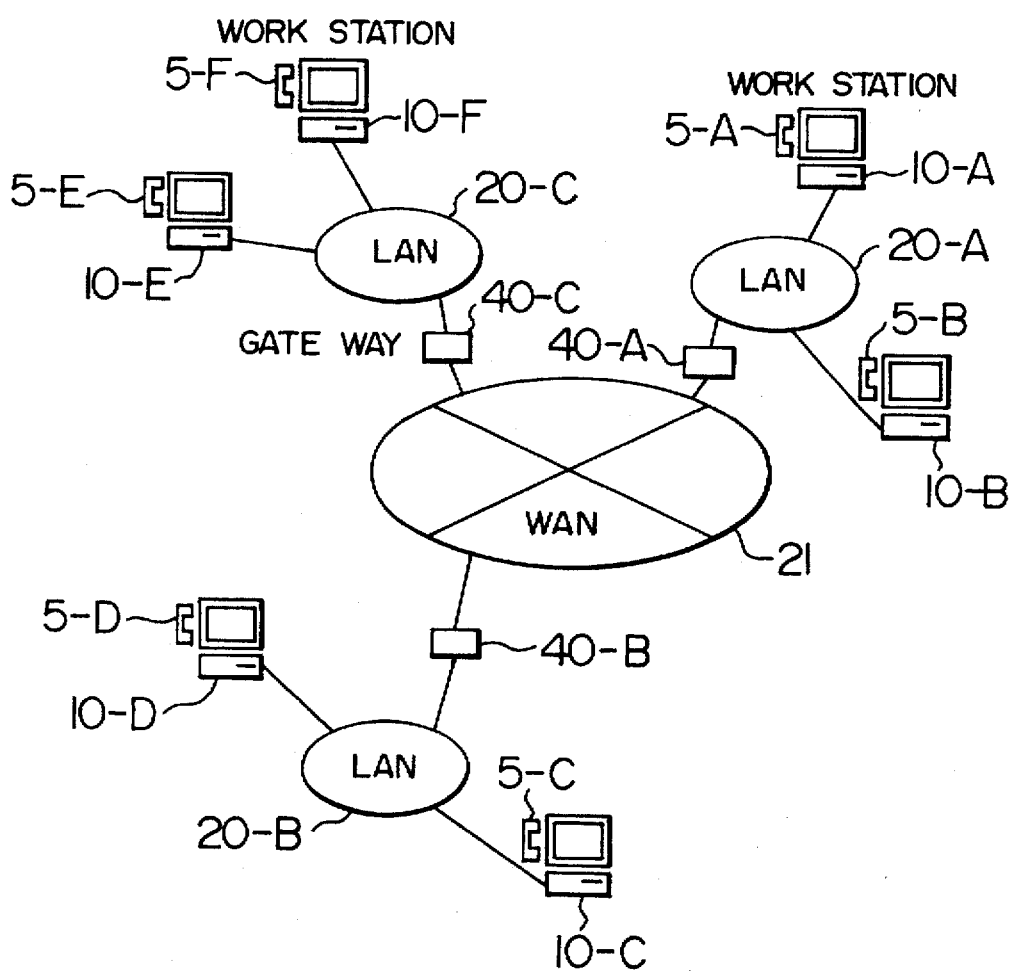
FIG. 1 is a diagram showing an example of the arrangement of the conference system based on this invention.

FIG. 1 is a diagram showing an example of the arrangement of the conference system to which this invention is applied. The conference system includes a plurality of workstations 10 (10-A to 10-F) connected through a communication network, with all workstations being equipped with individual telephone units 5 (5-A to 5-F).

The user of each workstation 10 who joins in a conference makes reference to conference materials displayed in conference (or electronic interaction) windows formed on the display screen of the workstation 10, and makes decisions in the conference or group work or carries out data processing such as document editing and material creation. Namely, the user processes information with the workstation while viewing it on the display screen, and is able to perform information processing activities which have not been possible only by talking.

Each workstation 10 has a conference control program for controlling the conference system, and each conference control program has its own program identifier. Messages sent between the workstations include message sender identifiers which identify conference programs of workstations which have issued the messages, based on which each workstation can identify the sender's conference control program from the received message.

Although the conference system shown in FIG. 1 includes six workstations (10-A, 10-B, ..., 10-F), there is no restriction in this invention on the number of workstations which can join in a conference.

Since conferences held by use of the foregoing workstations take place over a wide area in general, all workstations 10 are connected with each other through various communication sub-networks such as a LAN (local area network) 20 and a WAN (wide area network) 21.

In the system configuration of FIG. 1, LANs 20 (20-A to 20-C), to which workstations 10 are connected, are linked to a WAN 21 through gateways 40 (40-A to 40-C) which perform protocol conversion for communication messages, so that remote workstations can communicate with each other.

The telephone units 5 (5-A to 5-F) are connected with each other through the usual telephone network, which is not shown in FIG. 1. In order for the conference system to enable voice communication among multiple users, it necessitates a mixing device for multiplexing voice signals, and this means is provided as a function of the telephone network or exchange office.

The workstations and telephone units may be interconnected through an ISDN (integrated services digital network) which deals with both digital data and voice signals. Using the ISDN enables each workstation to control the communication network and telephone unit in a general manner, and it is advantageous from the viewpoint of ease of use and cost.

The basic arrangement of the remote conference system of this kind is described in detail in U.S. application Ser. No. 07/938,593, now U.S. Pat. No. 5,280,583, which is a continuation of U.S. application Ser. No. 07/350,850, now abandoned, and U.S. application Ser. No. 07/614,087, now U.S. Pat. No. 5,208,912, both of which are assigned to the assignee of the present application.

Figure 2:
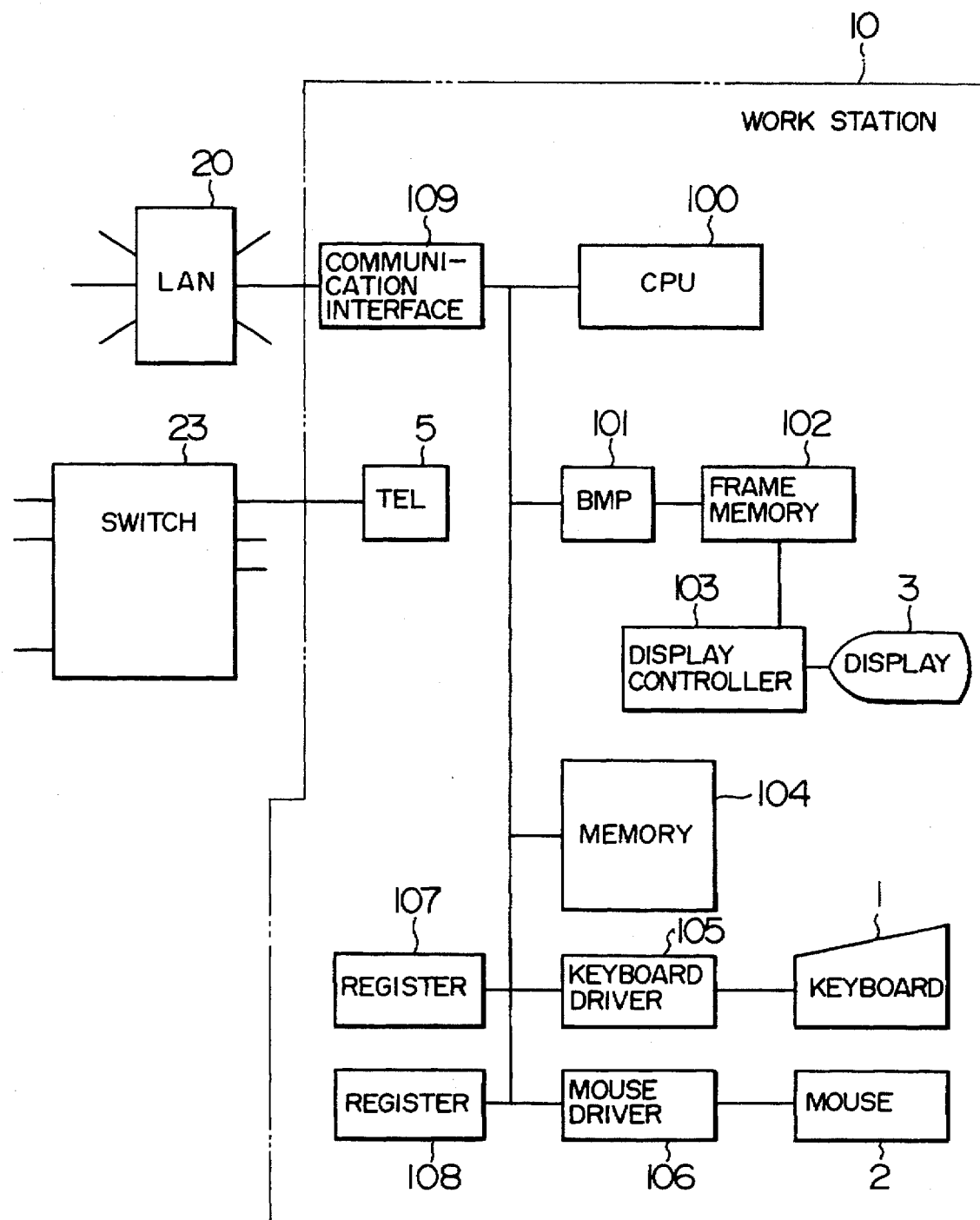
FIG. 2 is a block diagram showing the arrangement of the workstations which constitute the conference system.

FIG. 2 is a block diagram showing the basic arrangement of the workstation 10. Indicated by 1 is a keyboard, 2 is a mouse device, and 3 is a display device. Indicated by 104 is a memory for storing various kinds of programs and data, and 100 is a central processing unit (CPU) which carries out data processing in accordance with a program read out of the memory 104. The CPU 100 issues commands to a bit map processor (BMP) 101, which then controls the display on the display device 3. Specifically, the BMP 101 responds to a command from the CPU 100 to rewrite a frame memory 102 which stores the content of the display as image data.

103 denotes a display controller which transfers the contents of the frame memory 102 to the display device 3. 105 is a keyboard driver for loading character codes entered through the keyboard 1 into a register 107, and 106 is a mouse driver for loading codes entered through the mouse device 2 into a register 108, and 109 is a communication interface for connecting the CPU 100 to the LAN 20.

Although in this embodiment only the telephone unit 5 is connected to an exchange 23 and the workstation 10 is connected to the LAN (local area network) 20, it is possible to connect the telephone unit 5 and workstation 10 to the network through one ISDN interface.

Figure 3:
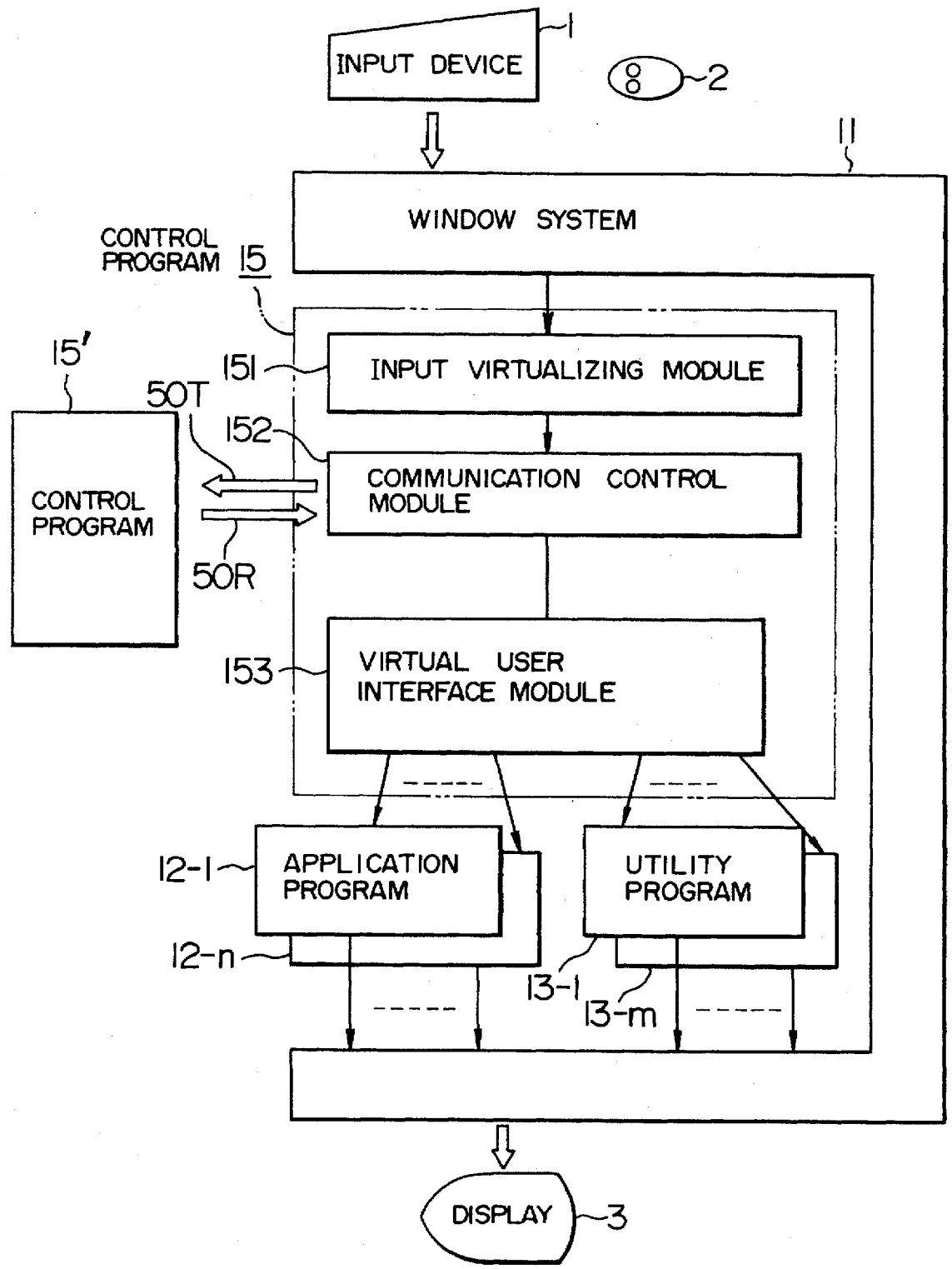
FIG. 3 is a block diagram used to explain the organization of software provided for each workstation.

FIG. 3 shows the basic organization of software set up in each workstation for accomplishing the conference system. In each workstation, various kinds of programs run by the CPU 100 and interface functions for the keyboard 1, mouse device 2, and display device 3 are provided by a window system 11. A program receives data which is entered by the keyboard 1 and mouse device 2 through the window system 11, and sends a display command to the window system 11 so that the result of execution of data processing is displayed on the display device 3.

Indicated by 15 is a conference control program. Conference control programs 15 (15') placed in all workstations in the network are linked through logical communication paths 50 (50R, 50T), so that a command entered on any workstation is transferred to other workstations by use of the function of the conference control program, thereby forming a conference field by which the same data process result can be referenced on these workstations.

Data visualized for the conference participants is produced and displayed by application programs 12 (12-1 to 12-n) and utility programs 13 (13-1 to 13-m). The application programs include a document editing program, table editing program and blackboard program, for example. In multiple workstations, the same application programs are run in unison under control of their conference control programs 15, whereby all participants can view the same display.

The utility programs 13 are prepared to enhance the ease of use of the application programs 12 for group work, and the programs include a PO (pointing object) control program for displaying a PO in the window used by an application program, for example. Using the PO control program, even in the case of applying an existing application program as one of conference application programs 12, enables all workstations to display their POs which point to the same position in the window where the application program is running.

The conference control program 15 is comprised of an input virtualizing module 151, a communication control module 152, and a virtual user interface module 153.

According to this invention, input data or an input command (which will be termed simply "input data" in the following explanation) which has been entered by a participant with the keyboard 1 or mouse device 2 is received by the input virtualizing module 151 through the window system 11, and it is converted to a specified data format (virtual input data), with a header including information such as a participant identifier being affixed thereto, used in the conference system. The virtual input data produced by the input virtualizing module 151 is transferred to the communication control module 152.

One of the roles of the communication control module 152 is to communicate with another conference control program 15' to supply input data created by one workstation to an application program 12 or a utility program 13 under control of the other conference control program 15' or to the utility program 13. Another role of the conference control module 152 is to transfer virtual input data entered with the keyboard 1 or mouse device 2 and virtual input data received from another workstation to the application program 12 and utility program 13 under control of the conference control program 15 of the local workstation through the virtual user interface module 153.

Since the window system 11 of each workstation controls windows independently from each other, if there is more than one window in conference mode to be operated to have the same display, it is necessary for input data received from another workstation to be identified for correspondence to the conference mode window of the local workstation.

In order to accomplish the correspondence between input data created by another workstation and the conference mode window of the local workstation, each time a conference mode window is created by any workstation, a serial identification number which is common in the whole conference system is assigned to the conference mode window, and the window name (or the name of the program which is run in that window) and the common window identification number is indicated to all workstations. The communication control module of each workstation has a record of the correspondence between the common window identification numbers and the window identifiers inherent to the local workstation pertinent to the indicated window names, and in sending input data created by the local workstation to another workstation, the communication control module sends the input data after converting the inherent window identifier attached to the input data by the window system into the common window identification number, and in receiving data from another workstation, the communication control module converts the common window identification number attached to the data into the inherent window identifier so that the received data can be distributed to the application program or utility program which is indicated by the inherent window identifier.

The virtual user interface module 153 supplies the received virtual input data to an appropriate application program 12 or utility program 13 without altering the format or by converting the data back to the original input data format.

The application program 12 and utility program 13 implement data processing for the input data which has been received through the above-mentioned procedure, and deliver the result to the display device 3 by way of the window system 11. It is possible for a conference control program 15 to have more than one application program and utility program. For example, multiple functions such as document editing and table calculation, or PO display and hand-written curve display, can be used concurrently in one conference.

Figure 4:
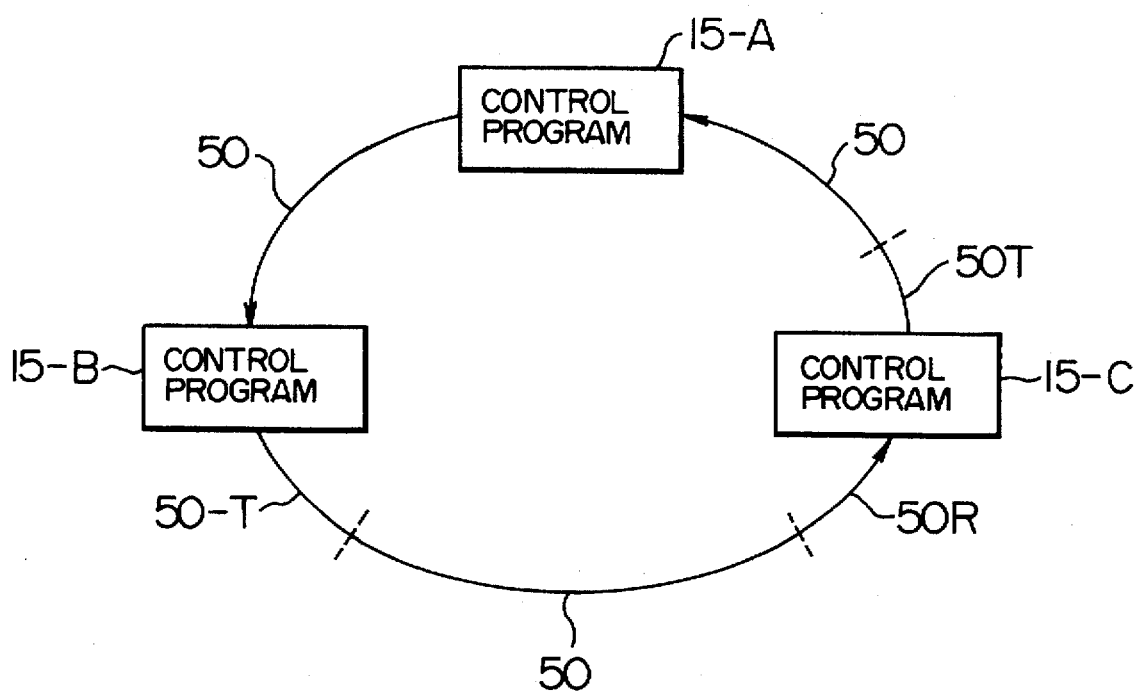
FIG. 4 is a diagram used to explain the method of forming a ring-shaped logical communication path.

Next, the method of forming logical communication paths 50 among three conference control programs 15-A, 15-B and 15-C will be explained with reference to FIG. 4. Devices such as the keyboard 1, mouse device 2, and display device 3 are not shown in the figure for simplicity of explanation.

The conference control programs 15 which constitute a conference system based on this invention each have two logical communication paths 50R and 50T. One path 50T is a sending path for transmitting virtual input data to the conference control program of another workstation, and another path 50R is a receiving path for receiving virtual input data from the conference control program of another workstation. By connecting the sending path of one conference control program (e.g., 15-B) to the receiving path of another conference control program (e.g., 15-C), a ring-shaped logical communication path 50 can be formed among multiple conference control programs. Input data entered with the keyboard 1 and mouse device 2 of one workstation is distributed to all conference control programs over the ring-shaped logical communication path 50.

Figure 5:
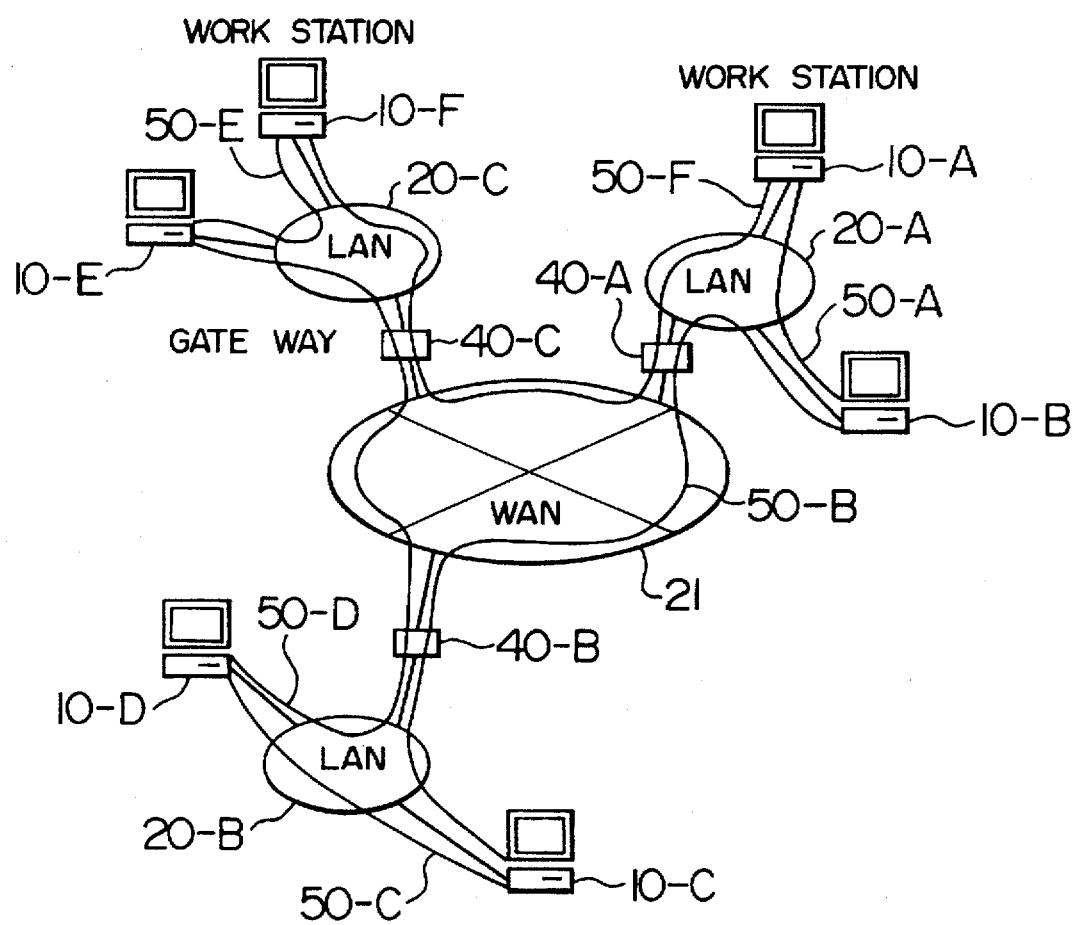
FIG. 5 is a diagram used to explain the ring-shaped logical communication path formed in a network based on the conference system shown in FIG. 1.

FIG. 5 shows the logical communication paths 50 (50-A to 50-F) which connect the workstations 10-A to 10-F shown in FIG. 1. Data is propagated in the prescribed direction over the logical communication paths 50 by the function of the conference control program 15 installed in all workstations.

Each workstation is connected with two other workstations through the above-mentioned two logical communication paths 50R and 50T. Each workstation receives data from one workstation and sends the data to another workstation in a fixed data transfer direction. Consequently, a ring-shaped logical communication path 50 is formed on the network as shown in FIG. 6.

The conference control program 15 of each workstation interacts with only two conference control programs adjacent to it connected through the logical communication paths 50R and 50T on the ring-shaped logical communication path. Since one conference system is formed by the conference control programs 15 installed in all workstations, the conference system will be expressed in the following explanation in the form of abstract nodes, each representing a conference control program, interconnected through the ring-shaped logical communication path.

Figure 7:
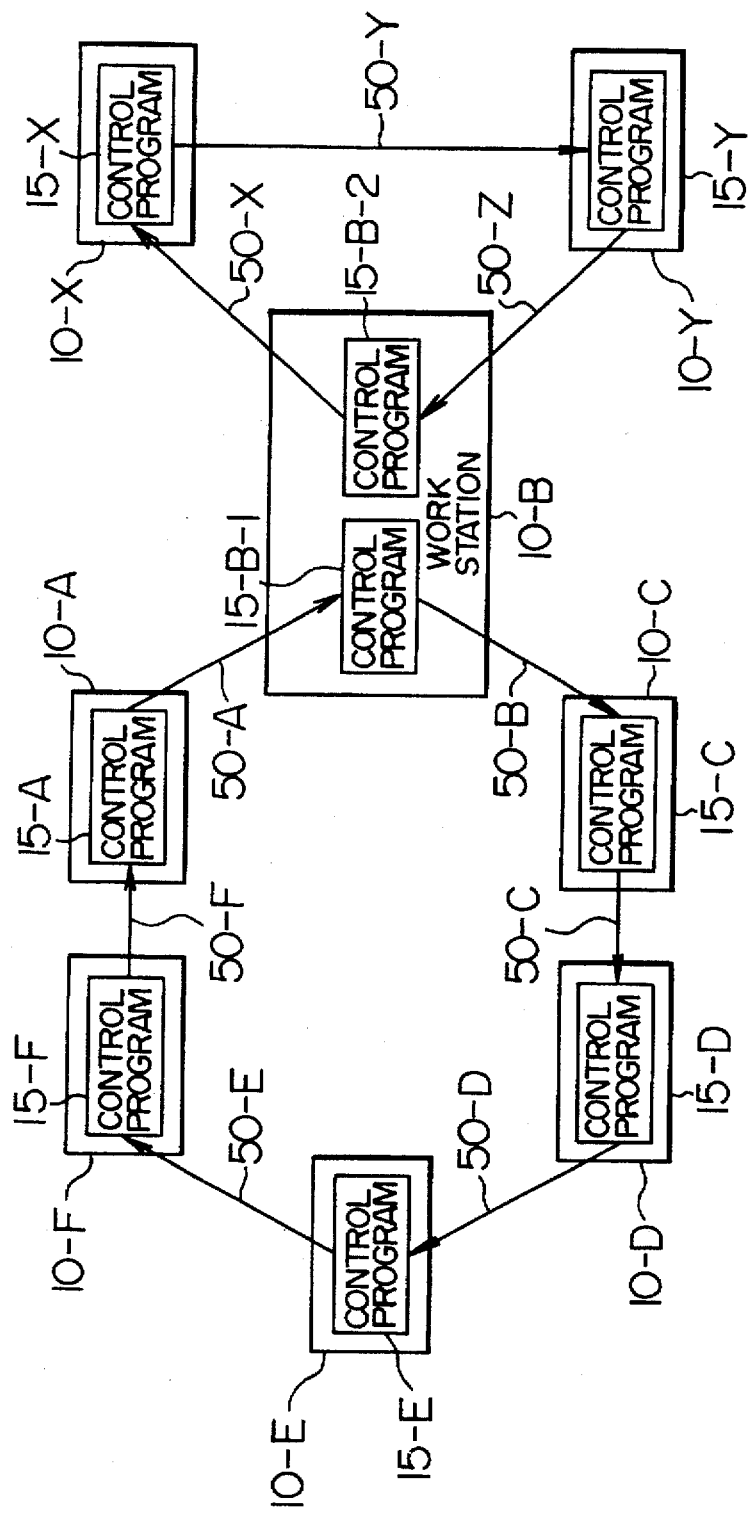
FIG. 7 is a diagram showing the state in which one workstation joins in two conferences.

FIG. 7 shows the state in which a workstation 10-B having two conference control programs 15-B-1 and 15-B-2 is joining in two conferences at the same time. One conference system is formed by conference control programs 15-A, 15-B-1, 15-C, 15-D, 15-E and 15-F linked through a ring-shaped logical communication path made up of logical communication paths 50-A, 50-B, 50-C, 50-D, 50-E and 50-F. Another conference system is formed by conference control programs 15-B-2, 15-X and 15-Y linked through a ring-shaped logical communication path made up of logical communication paths 50-X, 50-Y and 50-Z.

Figure 8:
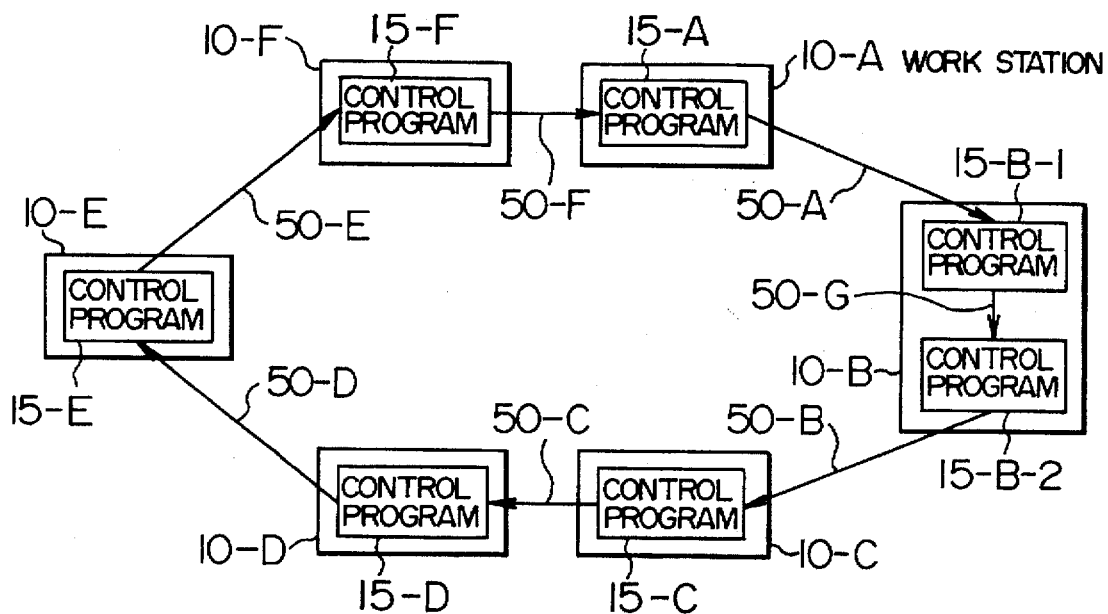
FIG. 8 is a diagram showing the state in which two users join in a conference on one workstation.

FIG. 8 is a diagram showing the state in which two users are joining in the same conference on one workstation 10-B.

The conference system is formed by conference control programs 15-A, 15-B-1, 15-B-2, 15-C, 15-D, 15-E and 15-F linked through a ring-shaped logical communication path made up of logical communication paths 50-A, 50-G, 50-B, 50-C, 50-D, 50-E and 50-F. In the workstation 10-B, the two conference control programs 15-B-1 and 15-B-2 operate concurrently to provide an environment in which the two users can join in the same conference. This function is important for a workstation which supports more than one display device.

Figure 9:
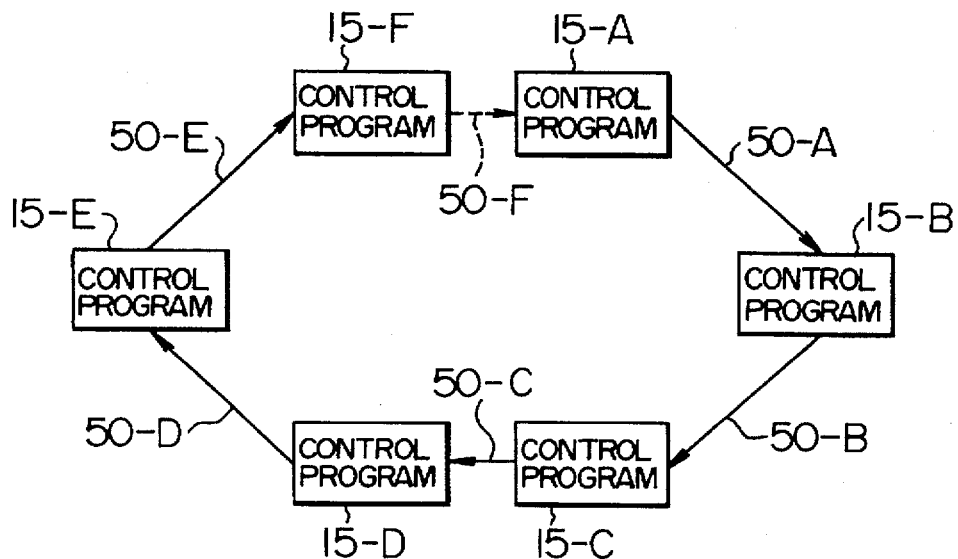
FIG. 9 is a diagram showing the state in which a fault has occurred on the ring-shaped logical communication path.

FIG. 9 is a diagram showing the occurrence of a fault in part of the ring-shaped logical communication path which forms the conference system. The logical communication path 50-F shown by the dashed line is the path on which the fault has occurred. In this case, the receive logical path is defective when seen from the conference control program 15-A and the send logical path is defective when seen from the conference control program 15-F.

Figure 10:
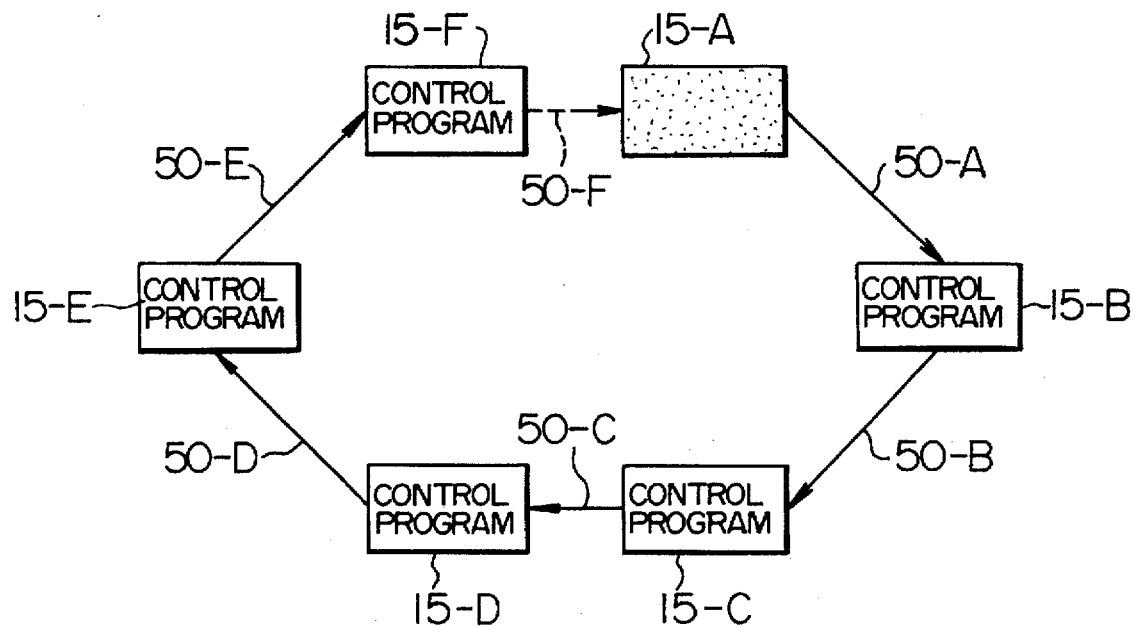
FIG. 10 is a diagram showing the state in which a fault has occurred in a node of the ring-shaped logical communication path.

FIG. 10 is a diagram showing the occurrence of a fault in one of the conference control programs included in the conference system. The conference control program 15-A shown by a shaded block is in trouble, and communication on the logical communication paths 50-A and 50-F is disabled. As a result, the receive logical path is defective for the conference control program 15-B, and the send logical path is defective for the conference control program 15-F.

The above-mentioned faults occurring on the logical communication path are detected based on this invention as follows.

Figure 11A:
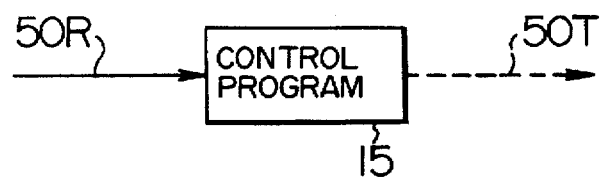
FIGS. 11A and 11B are diagrams used to explain the detection of faults which have occurred on the send logical path and the receive logical path, respectively.

FIG. 11A shows the occurrence of a fault on the send logical path 50T. The conference control program 15 is not aware of the fault on the send logical path 50T until it tries to send some data, and its sending operation will be responded to by a fault report from the communication interface or communication system such as an LAN.

Figure 11B:
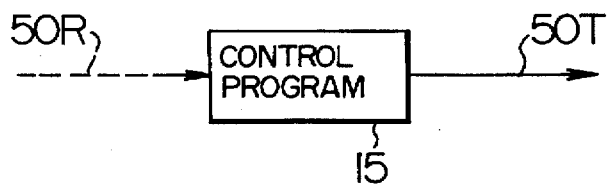

FIG. 11B shows the occurrence of a fault on the receive logical path 50R. The conference control program 15 is always ready to receive data during the conference, and the occurrence of a fault is reported immediately by the communication system. Namely, any fault arising on the ring-shaped logical communication path is detected by the program as a fault on the receive logical path.

Figure 12:
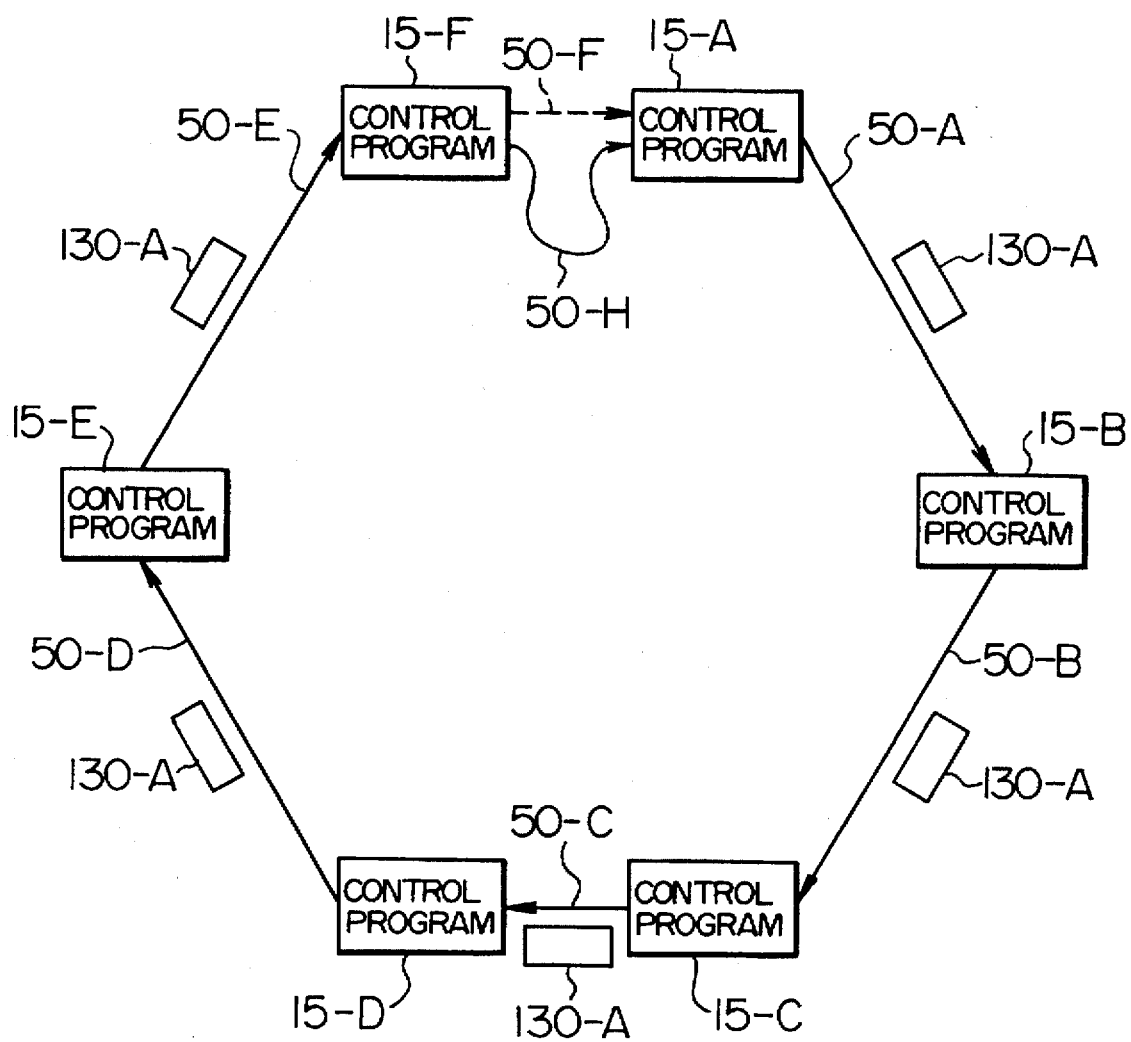
FIG. 12 is a diagram used to explain the method of forming a new logical communication path for fault recovery.

FIG. 12 shows a conference system formed by six conference control programs 15-A to 15-F linked by six logical communication paths 50-A to 50-F in the shape of a ring, and the occurrence of a fault on the logical communication path 50-F.

Figure 13:
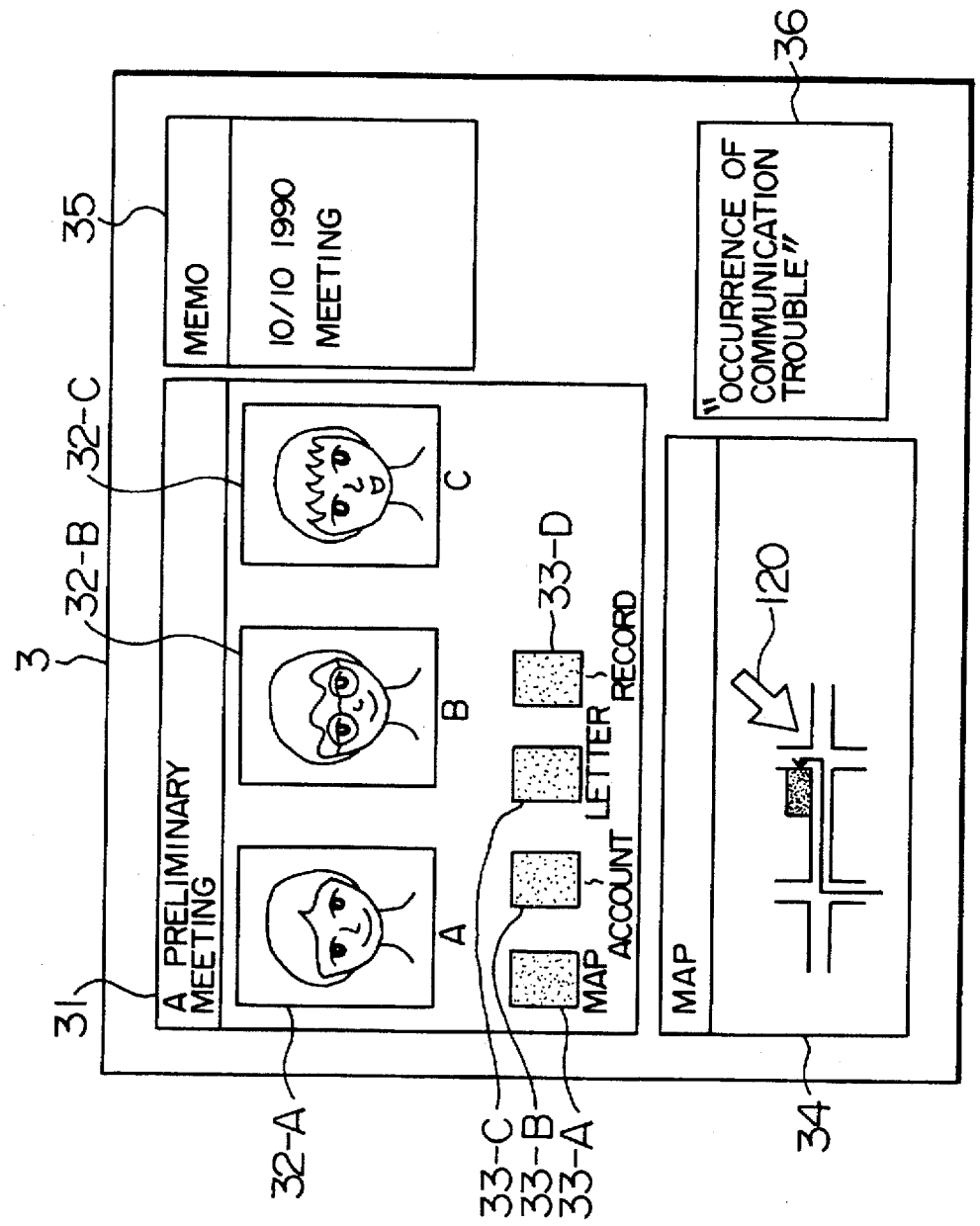
FIG. 13 is a diagram showing an example of the display screen of the workstation which is operating in a conference.

The defective path 50-F is the receive logical path for the conference control program 15-A, and therefore the fault is detected immediately by the program 15-A. On detecting the fault, the conference control program 15-A displays the event in the system message window 36 on the display device 3 of the workstation 10-A as shown in FIG. 13, for example. The program 15-A generates a fault recovery request message 130-A and sends it over the send logical path 50-A.

In FIG. 13, indicated by 31 is an example of a conference window which contains pictures 32-A to 32-C of the conference participants and icons of materials 33-A to 33-D. The content of a material is displayed in response to the selection of its icon. Indicated by 34 is a window for displaying a map which is created in response to the selection of the map icon 33A. These windows are displayed equally on all workstations which constitute the conference system. Indicated by 35 is a local window which is not directly related to the conference.

Figure 14:
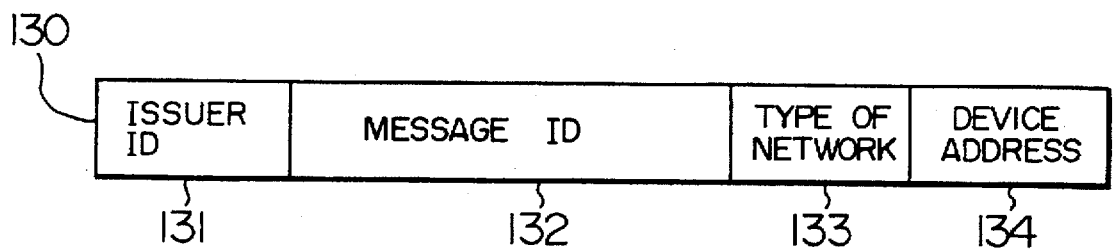
FIG. 14 is a diagram showing the format of a fault recovery request message.

FIG. 14 shows an example of the format of the fault recovery request message 130. The fault recovery request message consists of a sender ID field 131, a message ID field 132 indicative of a fault recovery request message, a network type field 133 indicative of the type of network to which the workstation issuing the fault recovery request message 130 belongs, and a workstation address field 134 indicative of the address of the workstation. Set to the sender ID field 131 is the identifier of the conference control program which has issued the fault recovery request message 130, i.e., the program which has detected the fault on the receive logical path in this case.

The network type field 133 is provided so that one workstation can be connected to more than one communication network. The reason for the presence of the sender ID field 131 in addition to the workstation address field 134 is to enable more than one conference control program to run on one workstation.

In the following explanation, the fault recovery request message issued by the conference control program 15-A will be referred to as 130-A for the sake of clarifying the correspondence between the message and its issuing party.

Returning to FIG. 12, the fault recovery request message 130-A reaches the conference control program 15-B through the ring-shaped logical communication path. The conference control program 15-B, which is operating normally, sends the received message to the next conference control program 15-C. In this manner, the fault recovery request message is propagated to the conference control program 15-C, to 15-D, 15-E and to 15-F.

The conference control program 15-F which is located on the upstream side of the fault point is unable to send the message to the next program 15-A due to the fault, and accordingly it detects the fault occurrence on its send logical path. The conference control program 15-F recognizes that it has to take the action of fault recovery in response to the fault recovery request message 130-A.

According to this invention, a new logical communication path 50-H which takes the place of 50-F is established between the conference control program 15-F that has detected the fault on its send logical path and the conference control program 15-A that has issued the fault recovery request message 130-A. In taking the above-mentioned fault recovery action, each conference control program 15 only needs to previously know the identifier of itself and the address of the workstation that issued the fault recovery request message.

Figure 15:
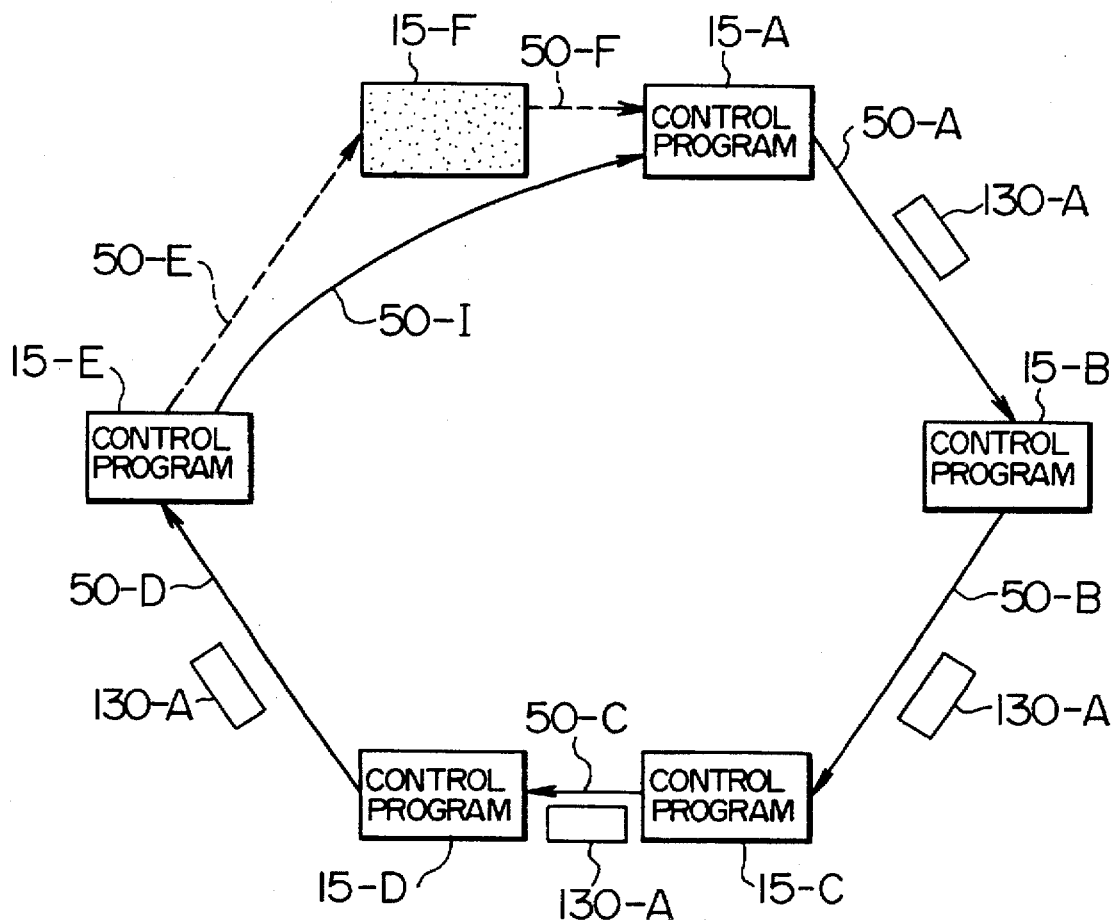
FIG. 15 is a diagram used to explain fault recovery of the type resulting in a degraded communication path.

FIG. 15 shows a conference system formed by six conference control programs 15-A to 15-F, and the state in which a fault has occurred in the conference control program 15-F and communication on the logical communication paths 50-E and 50-F is disabled.

The conference control program 15-A which uses the faulty path 50-F as its receive logical path detects the fault immediately, and generates a fault recovery request message 130-A and sends it over the send logical path 50-A.

The fault recovery request message 130-A reaches the conference control program 15-E by being relayed by the programs 15-B, 15-C and 15-D located along the ring-shaped logical communication path. The program 15-E tries to send the received message to the next program 15-E in vain, and recognizes that it has to take the recovery action for the fault which has been detected on its downstream side. When the program 15-E takes the action for establishing a new logical communication path 50-I to the sender 15-A of the message 130-A, a degraded version of the ring-shaped logical communication path is restored by bypassing the defective conference control program 15-F.

Figure 16:
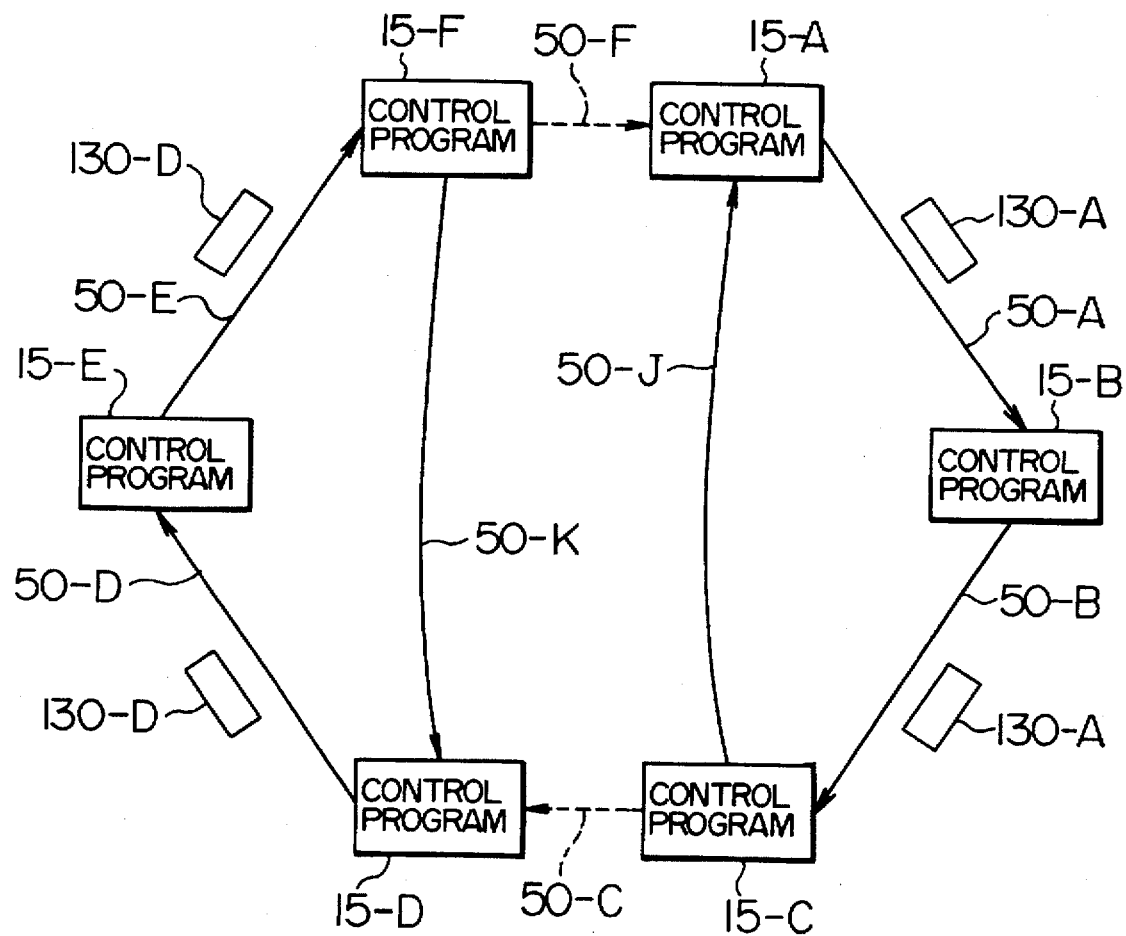
FIG. 16 is a diagram showing the state in which one ring-shaped logical communication path is divided into two ring-shaped logical communication paths.

FIG. 16 shows a conference system formed by six conference control programs 15-A to 15-F, and the state in which faults have occurred on two logical communication paths 50-F and 50-C at the same time.

The conference control program 15-A which uses the faulty path 50-F as its receive logical path detects the fault immediately. Similarly, the conference control program 15-D which uses the faulty path 50-C as its receive logical path detects the event immediately. These programs issue fault recovery request messages 130-A and 130-D and send the messages over the respective send logical paths 50-A and 50-D.

The message 130-A reaches the farthest-possible conference control program 15-C, which then takes the recovery action, and a new logical communication path 50-J is established between it and the program 15-A which has issued the message 130-A. At the same time, the conference control program 15-F which receives the message 130-D at the end of propagation takes the recovery action, and a new logical communication path 50-K is established between it and the program 15-D. Consequently, the defective ring-shaped logical communication path is recovered by being divided into two ring-shaped logical communication paths.

Figure 17:
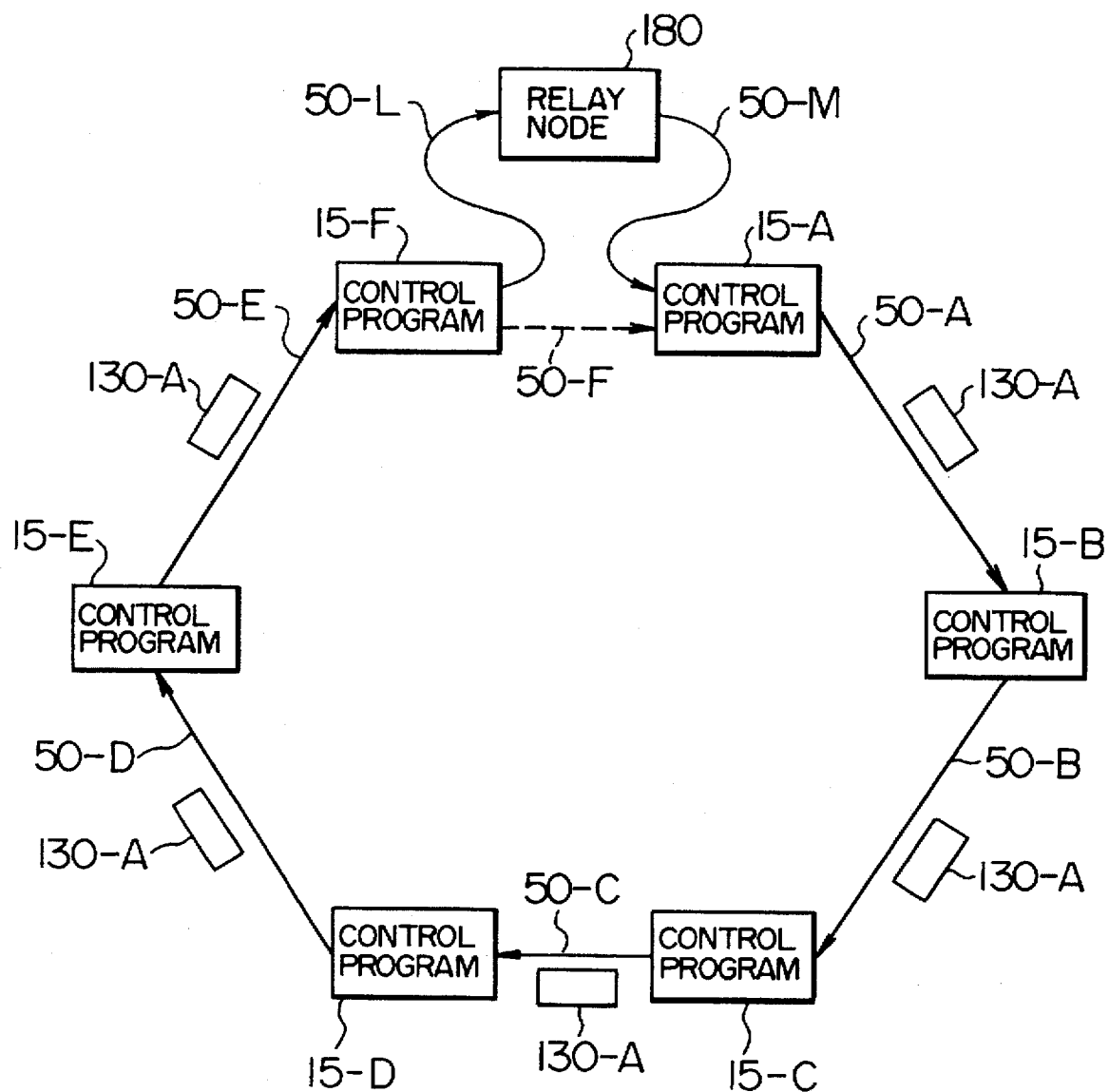
FIG. 17 is a diagram used to explain fault recovery by use of a relay node.

FIG. 17 shows another embodiment of the fault recovery operation of the conference system which is formed by six conference control programs 15-A to 15-F in the case in which a fault has occurred on the logical communication path 50-F. The conference control program 15-F which has received the fault recovery request message 130-A at the end of propagation tries to establish a new logical communication path to the conference control program 15-A that issued the message, and if it establishes the path successfully, the ring-shaped logical communication path is restored in the same manner as shown in FIG. 12.

This embodiment is intended to deal with the failure of establishment of a new path mentioned above, and in this case a logical communication path to the message issuing program 15-A is established by means of a proper relay node 180. Specifically, when the conference control program 15-F recognizes that a path to the program 15-A cannot be established, it forms a new logical communication path 50-L to the relay node 180 that is linked to the network to which it belongs, and the relay node 180 forms a new logical communication path 50-M to the conference control program 15-A.

Accordingly, if a set of logical communication paths 50-L and 50-M can be formed between the conference control programs 15-F and 15-A by way of the relay node 180, the ring-shaped logical communication path can be restored without the need of removing the workstation in connection with the defective logical communication path from the conference system.

The relay node 180 can be a computer which can have logical communication paths connected with multiple networks. In the case of the occurrence of a fault in a conference system based on a private communication network, the defective section can be bypassed by use of a public network as the above-mentioned relay node.

Figure 18:
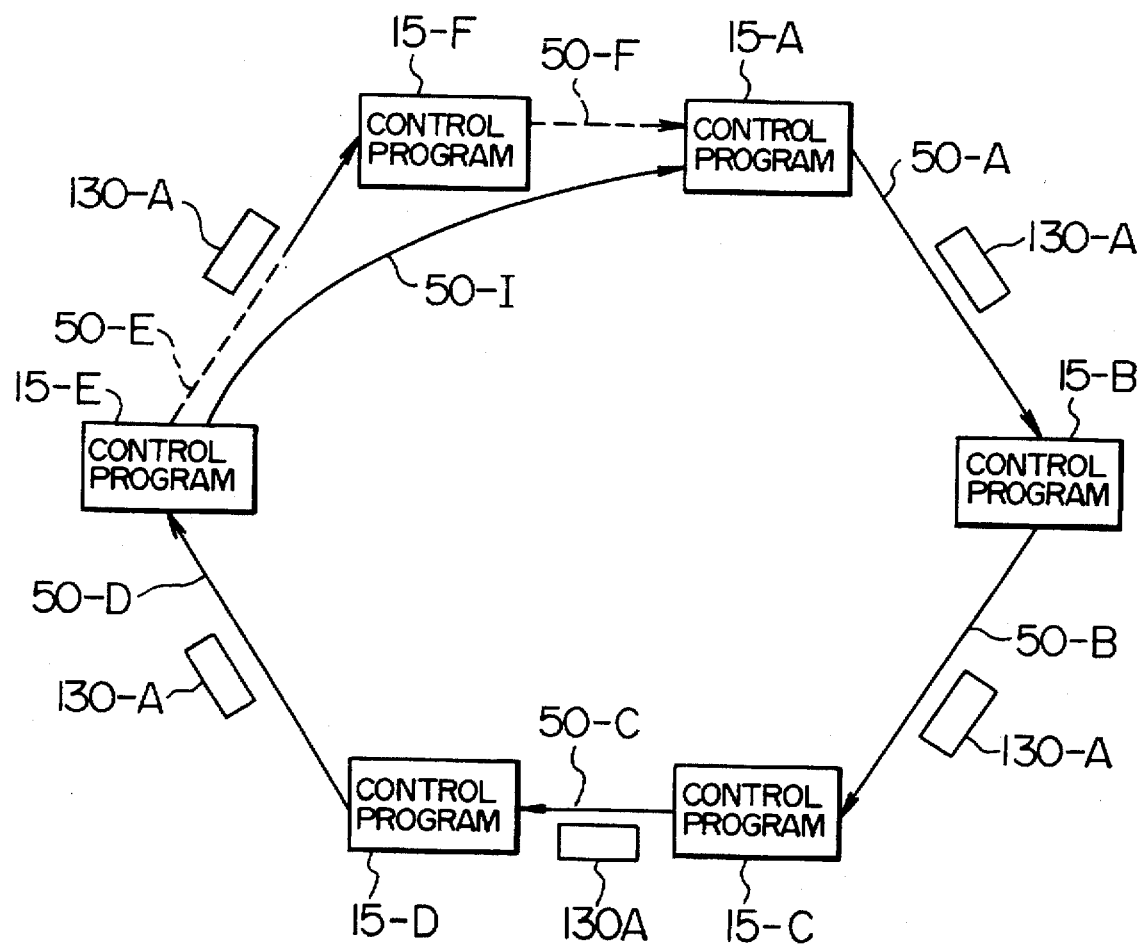
FIG. 18 is a diagram used to explain the method of fault recovery of the type resulting in a degraded path.

FIG. 18 shows another embodiment of the fault recovery operation of the conference system which is formed by six conference control programs 15-A to 15-F in the case in which a fault has occurred on the logical communication path 50-F. The conference control program 15-F which has received the fault recovery request message 130-A at the end of propagation tries to establish a new logical communication path to the conference control program 15-A that issued the message, and if it establishes the path successfully, a ring-shaped logical communication path identical to that shown in FIG. 15 is restored.

In this embodiment, if a certain time period has expired following the commencement of the setup operation of a new path, the conference control program 15-F abandons the establishment of a new logical communication path, releases the receive logical path 50-E, and removes itself from the ring-shaped logical communication path, i.e., from the conference system.

In case the conference control program 15-A that issued the fault recovery request message does not have its receive logical path established even on expiration of a certain time period following the issuance of the message, it issues a second fault recovery request message 130-A. The time limit for the operation of the conference control program 15-A is determined from the time limit for the recovery operation for the send logical path by the program 15-F and the propagation time of the message 130-A on the ring-shaped logical communication path.

The conference control program 15-E receives the second fault recovery request message 130-A and tries to send the received message to the conference control program 15-F. However, the program 15-F has already removed itself from the ring-shaped logical communication path, and therefore the conference control program 15-E is unable to send the message 130-A and recognizes a fault occurrence on its downstream side. Then, the program 15-E operates to establish a new logical communication path to the program 15-A in response to the fault recovery request message 130-A.

Consequently, a new logical communication path 50-I is established as shown in FIG. 18, and a conference system having a ring-shaped logical communication path of the degraded type as in the case of FIG. 15 is restored.

Figure 19:
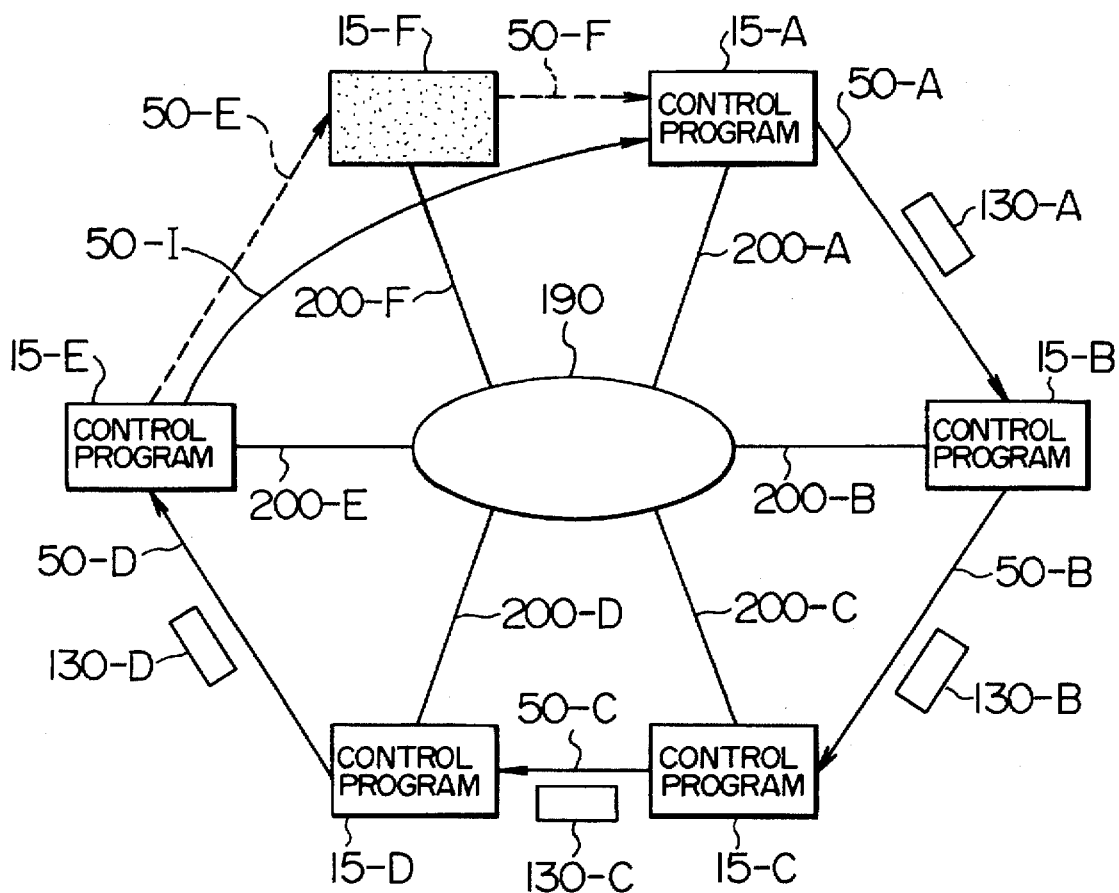
FIG. 19 is a diagram used to explain the ring-shaped logical communication path formed in a telephone network.

FIG. 19 shows a conference system in which six conference control programs 15-A to 15-F are connected logically in the shape of a ring through six logical communication paths 50-A to 50-F for data transmission formed in a network, and six telephone units (not shown) which belong to the individual workstations are connected with each other through a telephone network 190 by way of individual voice access lines 200-A to 200-F.

The following explanation is based on the assumption that a fault has occurred in the conference control program 15-F, disabling the communication on the logical communication paths 50-E and 50-F. The same control operation as explained with respect to FIG. 15 takes place, and the conference control program 15-F is removed and a conference system having a degraded ring-shaped logical communication path on which the conference control programs 15-E and 15-A are linked by a new logical communication path 50-I is reformed on the network. The telephone unit of the workstation 10-F is still in connection with the other telephone units through the telephone network which is independent of the conference control program 15-F that has been removed from the conference system due to the fault, and therefore the user of the workstation 10-F can stay in the conference by voice communication.

Figure 20:
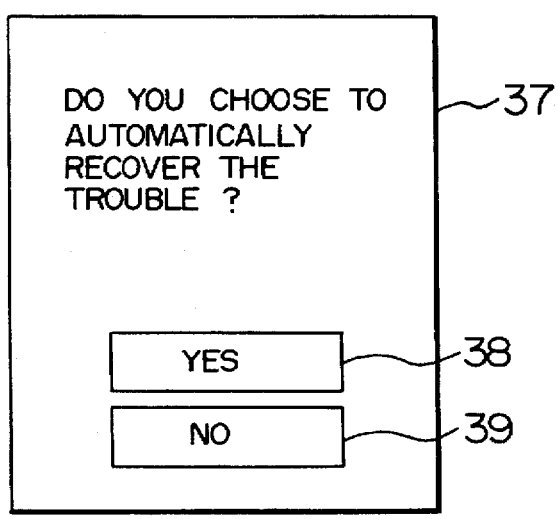
FIG. 20 is a diagram showing an example of a fault recovery menu.

FIG. 20 shows an example of a menu 37 which is displayed by each conference control program 15 on the display device 3 at the occurrence of a fault on a logical communication path for an inquiry as to whether automatic fault recovery is to be carried out. The menu 37 is displayed separately from the menu 36 shown in FIG. 13 which is intended for the fault occurrence message. The menu 37 may include a message which tells the degree and nature of the communication trouble.

The user who desires automatic recovery operates the mouse device 2 to select the area 38 indicating "YES", or otherwise the user selects the area 39 indicating "NO". If there is a possibility of improper automatic recovery for the ring-shaped logical communication path in which case the conference cannot be continued effectively, it is advisable to select "NO" so that the conference system is dissolved and to restart the conference opening procedure from the beginning.

FIG. 21 is a flowchart of the data sending process carried out by each conference control program 15 for recovering the logical communication path as described above.

The conference control program 15 continuously monitors the presence or absence of data (or a control command) to be sent over the send logical path (step 240), and on detecting data the program sends it to the next workstation connected to the send logical path (step 250). If the data is sent successfully ("YES" in step 260), the routine returns to step 240 and monitors the presence or absence of data. If data transmission fails ("NO" in step 260), the routine judges whether or not the faulty data transmission is caused by a communication failure (step 270).

In case the faulty data transmission is caused by other than communication failure, such as the case of a busy state of the data receiving conference control program ("NO" in step 270), the routine prepares to resend the same data (step 280) and thereafter returns to the step 250. In case the faulty data transmission is caused by a communication failure ("YES" in step 270), the routine displays a message of the occurrence of communication failure (step 290), and suspends the data sending function temporarily.

Figure 22A:
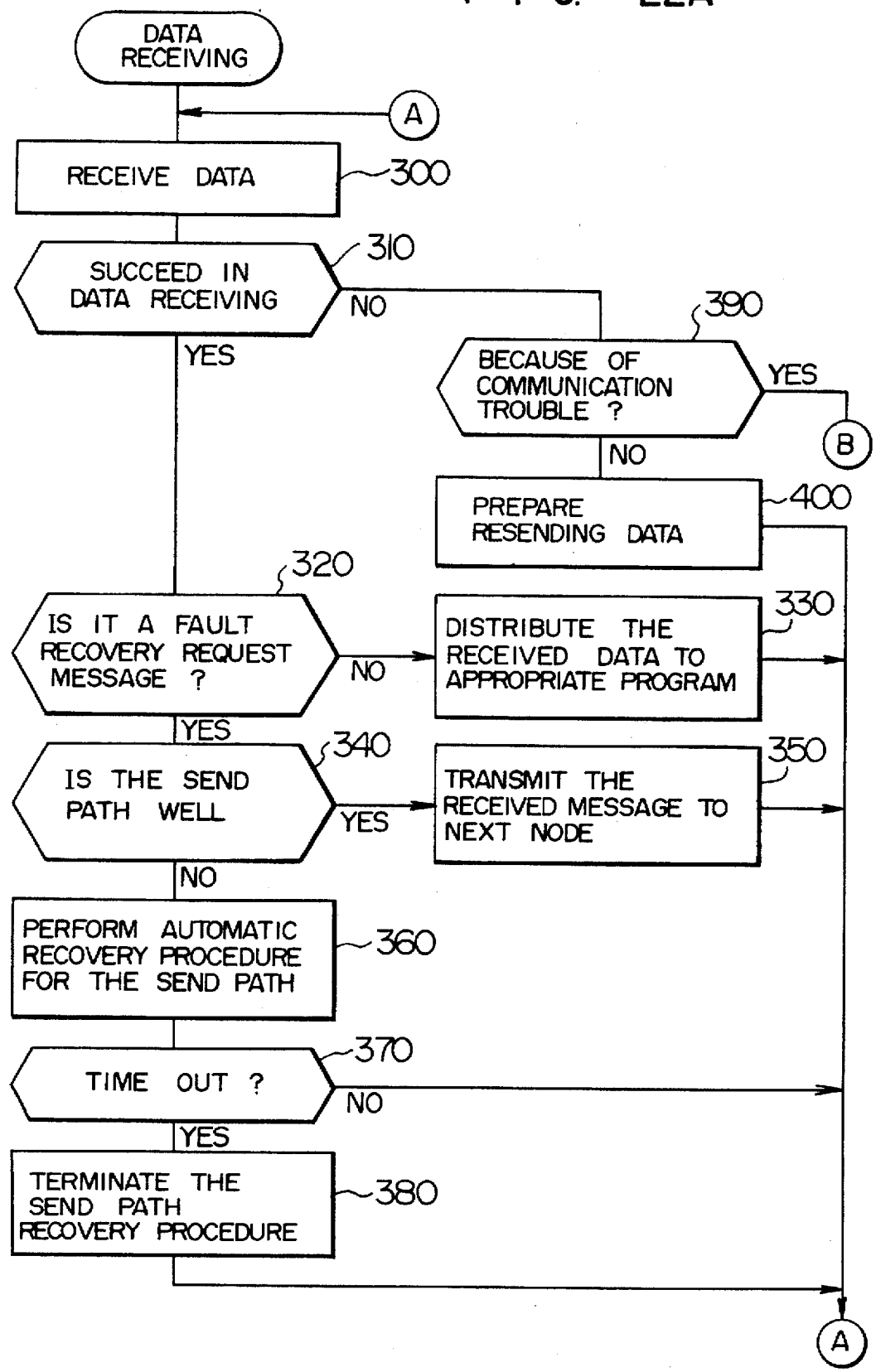
FIGS. 22A and 22B are flowcharts showing the data receiving process carried out by the conference control program.
Figure 22B:
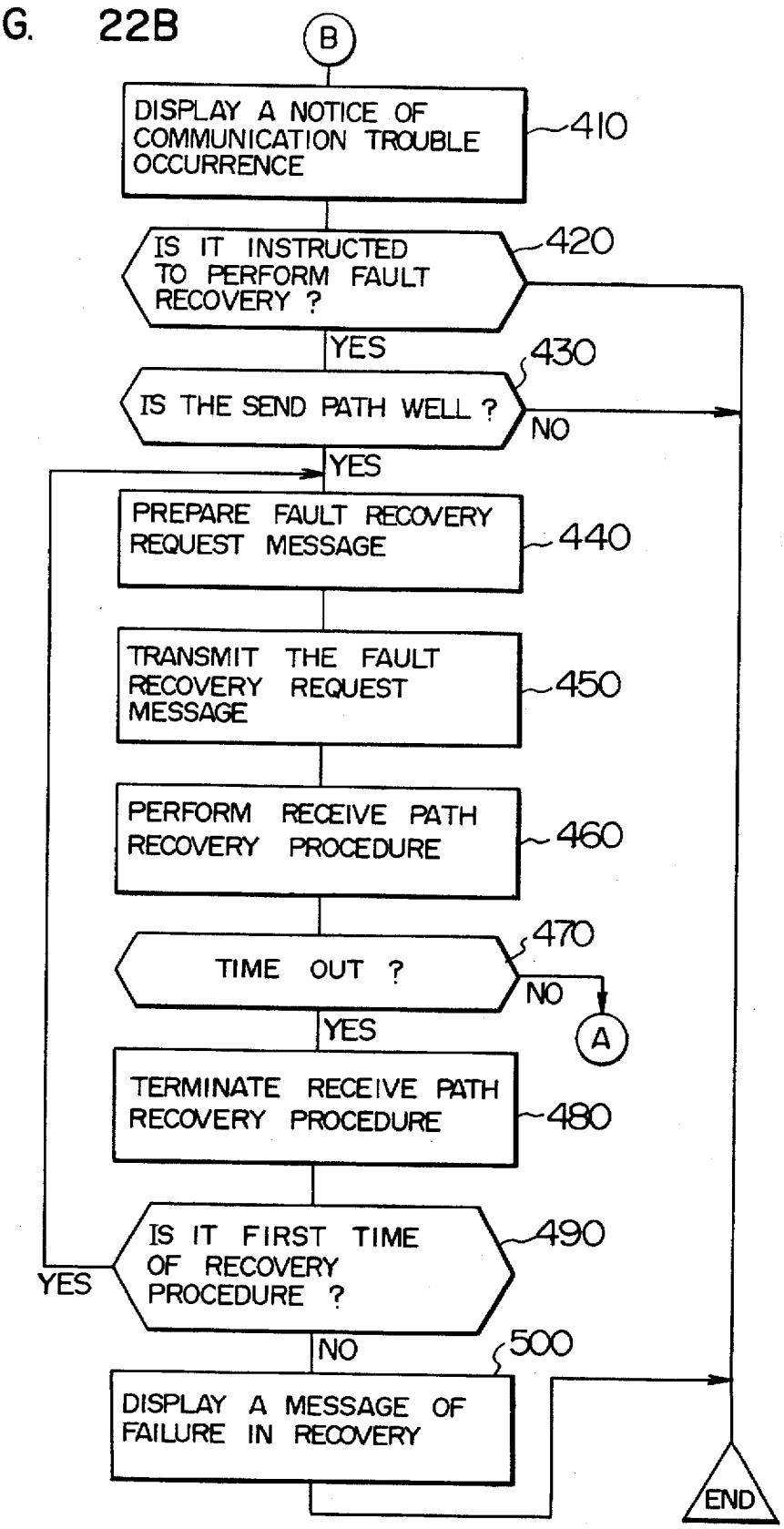

FIGS. 22A and 22B are flowcharts of the data receiving process carried out by the conference control program 15.

The conference control program 15 continuously monitors data reception over the receive logical path (step 300), and at a successful data reception (step 310) detects as to whether or not the received data is a fault recovery request message 130 (step 320). If it is found to be a fault recovery request message 130 and at the same time the send logical path is normal ("YES" in step 340), the routine sends the received fault recovery request message 130 to the next workstation connected to the send logical path (step 350).

If the received data is a fault recovery request message 130 and at the same time the send logical path is not normal (step 340), the routine performs a path recovery procedure for establishing a new logical communication path to the workstation which issued the fault recovery request message 130 (step 360). If the new logical communication path is established within a prescribed time limit (step 370), the routine returns to the normal data receiving operation, or if it fails to set up the path within the time limit (step 370), it performs the procedure for letting the workstation remove itself from the ring-shaped logical communication path (step 380).

In case the received data is not a fault recovery request message 130 ("NO" in step 320), the received data is distributed to an appropriate program (application program 12 or utility program 13) relevant to the received data (step 330).

In the case of faulty data reception over the receive logical path ("NO" in step 310), the routine judges whether or not it is caused by a communication failure (step 390). In case the faulty data reception is caused by other than communication failure, such as the case of insufficient buffer capacity, ("NO" in step 390), the routine prepares to receive the data again (step 400) and thereafter returns to the step 300.

In the case of faulty data reception caused by a communication failure ("YES" in step 390), the routine displays a message of the occurrence of communication failure (step 410), and, unless automatic fault recovery is requested by the user ("YES" in step 420) or if the send logical path is not normal ("NO" in step 430), it terminates the data receiving operation.

In case the user requests automatic fault recovery and if the send logical path is normal ("YES" in step 430), the routine generates a fault recovery request message 130 (step 440) and sends it to the next workstation connected to the send logical path (step 450). After that, the routine sets a certain time limit in a timer and waits for the control message from another workstation on its upstream side for the recovery of the receive logical path (step 460).

If the routine receives the control message (control command) of establishing a new logical communication path from the conference control program of the upstream workstation within the time limit of the timer ("NO" in step 470), the routine returns to the step 300. If the receive logical path is not established within the time limit ("YES" in step 470), the routine terminates the receive path recovery procedure (step 480), and returns to the steps 440 and 450 in which it generates and sends a second fault recovery request message 130. If the receive path recovery procedure is terminated a second time due to time limit expiration ("NO" in step 490), the routine displays a message of failure of recovery on the display device 3 (step 500) and terminates the data receiving operation.

According to the inventive communication path control described above, in the event of a communication failure, conference control programs of workstations which constitute a conference system operate in unison to recover the ring-shaped logical communication path automatically.

We claim:

1. A method of controlling a ring-shaped logical communication path formed in a network which connects a plurality of node means through respective inter-node communication paths, each of said node means operating to relay a message to a predetermined adjacent node means on a respective inter-node communication path so that said ring-shaped logical communication path is formed, said method comprising the steps of:

generating, by one of said plurality of node means that has detected a fault on its message receiving communication path, a control message indicative of a fault recovery request including a node identifier assigned to the node means that has detected the fault and sending the control message to an adjacent node means on a respective inter-node communication path of said ring-shaped logical communication path;

transferring, by each node means that has received the control message, the received control message to the adjacent node means on the respective inter-node communication path of said ring-shaped logical communication path; and establishing, by a node means that has failed to transfer the received control message to the adjacent node means on the respective inter-node communication path, a new inter-node communication path for message transmission directly to the node means on the respective inter-node communication path of the downstream side thereof indicated by the node identifier included in the received control message, the new inter-node communication path not including any node means which has transferred the received control message to the adjacent node means.

2. A control method for a ring-shaped logical communication path according to claim 1 including:

releasing, by said node means that has failed to transfer the received control message to the adjacent node means, the inter-node communication path on the message reception side thereof so that said node means that has failed to transfer the received control message to the adjacent node means retreats from said ring-shaped logical communication path if said node means that has failed to transfer the received control message to the adjacent node means has judged that a new inter-node communication path to said downstream node means indicated by the node identifier included in the control message cannot be established;

generating, by said node means that has generated the fault recovery request message, a second fault recovery request message including a node identifier assigned to the node means that has detected the fault and sending said second message to the adjacent node means on the respective inter-node communication path of said ring-shaped logical communication path if a new inter-node communication path is not established on the message reception side thereof within a prescribed time limit following the generation of the first control message or following the transmission of the message to the adjacent node means;

transferring, by each node means that has received the second control message, the received second control message to the adjacent node means on the respective inter-node communication path of said ring-shaped logical communication path; and establishing, by a node means that has failed to transfer the received second control message to the adjacent node means on the respective inter-node communication path, a new inter-node communication path for message transmission to the node means on the respective inter-node communication path of the downstream side thereof indicated by the node identifier included in the received second control message.

3. A control method for a ring-shaped logical communication path according to claim 1 including:

establishing, by said node means that has failed to transfer the received control message to the adjacent node means on the respective inter-node communication path, a new communication path for message transmission to the downstream node means on the respective inter-node communication path indicated by the node identifier included in the control message by using a communication network different from the network in trouble.

4. A control method for a ring-shaped logical communication path according to claim 1 including:

establishing, by said node means that has failed to transfer the received control message to the adjacent node means on the respective inter-node communication path, a new communication path to the downstream node means on the respective inter-node communication path indicated by the node identifier included in the control message, the new communication path to the downstream node means passing through a relay device having a relay function for relaying messages from the node means that has failed to transfer the received control message to the adjacent node means on the respective inter-node communication path to the downstream node means.

5. A method of controlling a ring-shaped logical communication path formed in a network which connects a plurality of node means, each of said node means operating to relay a message to a predetermined adjacent node thereof so that said ring-shaped logical communication path is formed, said method comprising:

generating, by one of node means that has detected a fault on its message receiving communication path, a control message indicative of a fault recovery request including a node identifier assigned to the node means that has detected the fault and sending the control message to the adjacent node on said ring-shaped logical communication path;

transferring, by each node means that has received the control message, the received control message to the adjacent node means on said ring-shaped logical communication path; and establishing by a node means that has failed to transfer the control message to the adjacent node, a new communication path for message transmission to the node means indicated by the node identifier included in the received control message, so that said ring-shaped logical communication path is divided into a plurality of ring-shaped logical communication paths by being rid of a faulty path.

6. A conference system including a plurality of workstations connected in a network, each of said workstations comprising:

display means having a multi-window display function;

input means for entering data and/or a command to an arbitrary window created on the display screen of said display means;

data processing means for processing the data and/or command entered through said input means in accordance with a program which corresponds to the window where the data and/or command has been entered, and displaying the result of process in said window of said display screen; and interface means for transacting data with said network, said data processing means including conference control means which correlates one of said workstations to an input logical communication path and another workstation to an output logical communication path, sends a message which includes data and/or command entered from said input means and said interface means to the workstation corresponding to the output logical communication path through said interface means, and operates on a program to process said entered data and/or command, said conference control means including first means for generating, on detecting abnormality of data reception of said interface means from said network, a control message including a control command for fault recovery which includes an identifier assigned to said conference control means, and sending the message to the workstation corresponding to the output logical communication path, and second means for establishing, if said first means fails to send a fault recovery control message generated by any workstation and received by said interface means to the workstation corresponding to the output logical communication path, a new communication path to the workstation having the conference control means indicated by the identifier included in the control message, and correlating, to the output logical communication path, the workstation having the conference control means indicated by the identifier included in the control message.

7. A conference system according to claim 6, wherein said second means includes means for dissolving the input logical communication path if said second means fails to establish a new communication path to the workstation having the conference control means indicated by the identifier included in the control message so that the workstation having the second means which fails to establish a new communication path to the workstation having the conference control means indicated by the identifier included in the control message retreats from the conference system.

8. A conference system according to claim 6, wherein said first means includes means for sending recurrently the fault recovery control message if said first means fails to receive a signal for establishing a new communication path from said interface means within a prescribed time limit following the generation or transmission of said control message.

9. A conference system according to claim 6, wherein said conference control means includes means for displaying on said display screen, on detecting an abnormality due to communication failure, a message for inquiring of a user of the conference control means whether or not automatic recovery of a communication path is to be tried, said first means generating and sending the control message in response to entry by the user of a command indicative of automatic recovery from said input means.

10. A method of controlling a ring-shaped logical communication path formed in a network which connects a plurality of node means through respective inter-node communication paths, each of said node means operating to relay a message to a predetermined adjacent node means on a respective inter-node communication path so that said ring-shaped logical communication path is formed, said method comprising:

generating, by each of at least two of said plurality of node means that have detected respective faults on their respective message receiving communication paths, a control message indicative of a fault recovery request including a node identifier assigned to the node means that has detected the fault and sending the control message to an adjacent node means on a respective inter-node communication path of said ring-shaped logical communication path;

transferring, by each node means that has received the control message, the received control message to the adjacent node means on the respective inter-node communication path of said ring-shaped logical communication path; and establishing, by each of at least two node means that have failed to transfer the control message to the adjacent node means on the respective inter-node communication path, a new inter-node communication path for message transmission directly to the node means on the respective inter-node communication path of the downstream side thereof indicated by the node identifier included in the received control message, each new inter-node communication path not including any node means which has transferred the received control message to the adjacent node means, so that said ring-shaped logical communication path is divided into a plurality of ring-shaped logical communication paths by being rid of at least two faults.

* * * * *